US011011750B2

(12) United States Patent
Hori et al.

(10) Patent No.: US 11,011,750 B2
(45) Date of Patent: May 18, 2021

(54) METHOD FOR MANUFACTURING A POSITIVE ELECTRODE SHEET FOR A LITHIUM ION SECONDARY BATTERY AND A POSITIVE ELECTRODE SHEET FOR A LITHIUM ION SECONDARY BATTERY

(71) Applicant: TOYOTA JIDOSHA KABUSHIKI KAISHA, Toyota (JP)

(72) Inventors: Yukiko Hori, Miyoshi (JP); Masanori Kitayoshi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 758 days.

(21) Appl. No.: 15/168,657

(22) Filed: May 31, 2016

(65) Prior Publication Data

US 2017/0018770 A1 Jan. 19, 2017

(30) Foreign Application Priority Data

Jul. 13, 2015 (JP) .............................. JP2015-139621

(51) Int. Cl.
*H01M 4/13* (2010.01)
*H01M 4/62* (2006.01)
*H01M 4/00* (2006.01)
*H01M 4/50* (2010.01)
*H01M 4/58* (2010.01)
(Continued)

(52) U.S. Cl.
CPC ......... *H01M 4/505* (2013.01); *H01M 4/0404* (2013.01); *H01M 4/131* (2013.01); *H01M 4/1391* (2013.01); *H01M 4/366* (2013.01); *H01M 4/525* (2013.01); *H01M 4/622* (2013.01);
(Continued)

(58) Field of Classification Search
None
See application file for complete search history.

(56) References Cited

U.S. PATENT DOCUMENTS

2013/0017442 A1* 1/2013 Cha ....................... H01M 4/505
429/211
2013/0323605 A1* 12/2013 Yamamoto ............ H01M 4/587
429/332

(Continued)

FOREIGN PATENT DOCUMENTS

CN 101241988 A 8/2008
JP 2006-004739 A 1/2006
(Continued)

*Primary Examiner* — Cynthia H Kelly
*Assistant Examiner* — Julian Anthony
(74) *Attorney, Agent, or Firm* — Sughrue Mion, PLLC

(57) ABSTRACT

A method for producing a positive electrode sheet is provided with a positive current collecting foil made of aluminum and a battery positive active material layer containing positive active material particles made of LiNiMn based spinel and applied and dried on the current collecting foil. The positive active material layer includes a first binder made of polyacrylic acid with a molecular weight of 50,000 or less and a second binder made of polyacrylic acid with a molecular weight of 300,000 or more. The first positive electrode paste forming the positive active material layer satisfies expressions (1) to (3):

$$\alpha \geq 1.7 \quad (1)$$
$$\beta \geq 0.9 \quad (2)$$
$$\alpha + \beta \leq 3.0 \quad (3)$$

where $\alpha$ is an additive amount of the first binder in pts. wt. and $\beta$ is an additive amount of the second binder in pts. wt. when other solid content is 100 pts. wt.

7 Claims, 12 Drawing Sheets

(51) Int. Cl.
  *H01M 4/82*    (2006.01)
  *H01M 6/00*    (2006.01)
  *H01M 4/505*   (2010.01)
  *H01M 4/66*    (2006.01)
  *H01M 4/525*   (2010.01)
  *H01M 4/04*    (2006.01)
  *H01M 4/131*   (2010.01)
  *H01M 4/1391*  (2010.01)
  *H01M 4/36*    (2006.01)
  *H01M 10/0525* (2010.01)

(52) U.S. Cl.
  CPC ........ H01M 4/661 (2013.01); *H01M 10/0525* (2013.01)

(56) References Cited

U.S. PATENT DOCUMENTS

2014/0065477 A1*  3/2014  Han ............... H01M 4/525
                                              429/211
2014/0255777 A1*  9/2014  Jeong ............. H01M 4/134
                                              429/211

FOREIGN PATENT DOCUMENTS

| | | |
|---|---|---|
| JP | 2009-252348 A | 10/2009 |
| JP | 2010-108624 A | 5/2010 |
| JP | 2013218895 A | 10/2013 |
| KR | 10-2015-0028662 A | 3/2015 |

* cited by examiner

METHOD FOR MANUFACTURING A POSITIVE ELECTRODE SHEET FOR A LITHIUM ION SECONDARY BATTERY AND A POSITIVE ELECTRODE SHEET FOR A LITHIUM ION SECONDARY BATTERY

CROSS-REFERENCE TO RELATED APPLICATIONS

This application is based upon and claims the benefit of priority from the prior Japanese Patent Application No. 2015-139621, filed Jul. 13, 2015, the entire contents of which are incorporated herein by reference.

BACKGROUND

Technical Field

The present disclosure relates to a method for manufacturing a positive electrode sheet to be used for a lithium ion secondary battery, and, a positive electrode sheet for a lithium ion secondary battery.

Related Art

As the material of positive active material particles of a lithium ion secondary battery (hereinafter, also simply referred to as a battery), there is proposed Li transition metal composite oxide. To be concrete, layered lithium metal oxide such as $LiCoO_3$, spinel-type lithium metal composite oxide, olivine-type lithium phosphate compound, and others are proposed. Particularly, LiNiMn based spinel particles can relatively increase positive potential during full charge.

Therefore, when positive active material particles made of Li transition metal composite oxide such as LiNiMn based spinel are dispersed in water in order to produce a water-based positive electrode paste, Li ions are ionized. Thus, this produced paste is strongly alkaline. For this reason, the water-based positive electrode paste containing positive active material particles made of Li transition metal composite oxide exhibits strong alkalinity above pH 9.0. When such a strong alkaline positive electrode paste is applied to a positive current collecting sheet made of aluminum and then dried, forming a positive active material layer, the positive current collecting sheet is corroded by the positive electrode paste, resulting in deterioration of adhesion property (binding property) of the positive active material layer to the positive current collecting sheet. Further, electric resistive oxides and hydroxides are generated. This may cause defects such as increased battery resistance.

In contrast, Patent Document 1 proposes forming a conductive material layer made of conductive material such as carbon powder in advance on a surface of a positive current collecting sheet in order to prevent corrosion of the current collecting sheet made of aluminum, and then, applying a composition for forming an active material layer containing water-based solvent (positive electrode paste).

RELATED ART DOCUMENTS

Patent Documents

Patent Document 1: JP-A-2006-004739

SUMMARY

Technical Problems

However, the above method needs a step of forming the conductive material layer in advance on the positive current collecting sheet and thus leads to a complicated manufacturing process.

Meanwhile, polyacrylic acid added as a binder to the positive electrode paste exhibits acidity. Further, polyacrylic acid having a small molecular weight tends to exhibit stronger acidity than polyacrylic acid having a large molecular weight.

In contrast, as for binding property, the polyacrylic acids exhibit opposite tendency to the above. Specifically, the polyacrylic acid with a smaller molecular weight has lower binding strength, while the polyacrylic acid with a larger molecular weight has higher binding strength. Accordingly, even under the condition of the same additive weight of the polyacrylic acids, a positive active material layer made by addition of the polyacrylic acid with a small molecular weight is likely to come off, while a positive active material layer made by addition of the polyacrylic acid with a large molecular weight is less likely to come off.

Meanwhile, the volume specific resistance of the positive active material layer is lower as the additive amount of the binder is smaller. Thus, the resistance (IV resistance) of a battery including this positive active material layer can also be reduced. However, a smaller additive amount of the binder causes deterioration in bonding strength to the positive current collecting sheet and thus leads to lower peel strength between the positive current collecting sheet and the positive active material layer.

The present disclosure has been made in view of such circumstances and provides a method for producing a positive electrode sheet for a lithium ion secondary battery so as to achieve good binding relation between a positive current collecting sheet and a positive active material layer and reduced resistance of the positive active material layer, while the method includes a step of applying and drying a positive electrode paste on the positive current collecting sheet made of aluminum, the positive electrode paste including water-based solvent containing positive active material particles made of LiNiMn based spinel. Further, the present disclosure provides a positive electrode sheet for a lithium ion secondary battery, the positive electrode sheet including a positive current collecting sheet made of aluminum and a positive active material layer containing positive active material particles made of LiNiMn based spinel applied and dried on the positive current collecting sheet, and the positive electrode sheet providing good binding property between the positive current collecting sheet and the positive active material layer and reduced resistance of the positive active material layer.

Means of Solving the Problems

One aspect of the present disclosure provides a method for producing a positive electrode sheet for a lithium ion secondary battery, the positive electrode sheet comprising: a positive current collecting sheet made of aluminum; and a positive active material layer applied and dried on the positive current collecting sheet, the positive active material layer containing positive active material particles made of LiNiMn based spinel, wherein the positive active material layer includes a first positive active material layer provided in contact with the positive current collecting sheet, and the first positive active material layer includes: a first binder made of polyacrylic acid having a molecular weight of 50,000 or less; and a second binder made of polyacrylic acid having a molecular weight of 300,000 or more, wherein the method includes a first applying and drying step of applying a first positive electrode paste to the positive current collecting sheet, the first positive electrode paste having been prepared by mixing the positive active material particles with water-based solvent, and drying the first positive electrode paste to form the first positive active material layer, and the first positive electrode paste includes the first binder and the second binder, and satisfies expressions (1) to (3):

$$\alpha \geq 1.7 \quad (1)$$

$$\beta \geq 0.9 \quad (2)$$

$$\alpha + \beta \leq 3.0 \quad (3)$$

where $\alpha$ is an additive amount of the first binder in parts by weight and $\beta$ is an additive amount of the second binder in parts by weight when a solid content except the first binder and the second binder in a solid content of the first positive electrode paste is 100 parts by weight.

In the above method for producing a positive electrode sheet, the first positive electrode paste containing the second binder having high binding property. Thus, as compared with a case of using only the first binder as the binder, the peel strength of the first positive active material layer can be enhanced. To be concrete, the additive amount $\beta$ of the second binder having a molecular weight M of 300,000 or more is set to 0.9 or more ($\beta \geq 0.9$). Accordingly, the first positive active material layer formed on the positive current collecting sheet can have a peel strength Ip of 40 N/m or more (Ip≥40 N/m).

Further, in this method for producing a positive electrode sheet, the first positive electrode paste exhibiting alkalinity deriving from the positive active material particles contains 1.7 parts by weight (pts. wt.) or more ($\alpha \geq 1.7$) of the first binder exhibiting acidity in addition to the second binder exhibiting acidity. Thus, a hydrogen ion concentration index (pH) of the first positive electrode paste decreases to 9.0 or less (pH≤9.0). Accordingly, even when the first positive electrode paste is applied to the positive current collecting sheet made of aluminum, corrosion of the positive current collecting sheet is suppressed. It is further possible to suppress an increase in resistance between the positive current collecting sheet and the positive active material layer (the first positive active material layer) which may be caused in association with corrosion of the surface of the positive current collecting sheet.

In addition, the sum of the additive amount $\alpha$ of the first binder and the additive amount $\beta$ of the second binder (i.e., a total amount of the binders), $\alpha+\beta$, is limited to 3.0 pts. wt. or less ($\alpha+\beta \leq 3.0$). This can suppress an increase in resistance of the first positive active material layer due to addition of the binders, an associated resistance increase of the positive electrode sheet, and hence an increase in battery resistance Rc. To be specific, a battery for evaluation of battery resistance having a configuration mentioned later can reduce the battery resistance Rc to 730 mΩ or less (Rc≤730 mΩ).

The LiNiMn based spinel is a positive active material that has a spinel type crystal structure including Li at A-site, Ni and Mn at B-site as a main part. Examples thereof include Li(Ni, Mn)$_2$O$_4$, Li(Ni, Mn, Co)$_2$O$_4$, etc.

The molecular weight M of the first binder has only to be 100 or more. This molecular weight M may be in a range from 1,000 to 50,000. In contrast, the molecular weight M of the second binder may be set to 2,000,000 or less. This is because if the molecular weight of polyacrylic acid is too large, addition of such polyacrylic acid to the positive electrode paste causes high viscosity of the positive electrode paste, thus falling short of desired fluidity of the positive electrode paste.

Further, the positive electrode paste may contain, as solid content, a conductive auxiliary material such as carbon black and acetylene black, and a thickening agent such as CMC as well as the positive active material particles. The positive active material layer of the positive electrode sheet to be produced may be formed of only the first positive active material layer, that is, may be configured such that the positive active material layer corresponds to the first positive active material layer or that the positive active material layer is configured in the form of a plurality of layers including the first positive active material layer and another positive active material layer(s) placed on the first positive active material layer.

Another aspect of the present disclosure provides a positive electrode sheet comprising: a positive current collecting sheet made of aluminum; and a positive active material layer applied and dried on the positive current collecting sheet, the positive active material layer containing positive active material particles made of LiNiMn based spinel, wherein the positive active material layer includes a first positive active material layer provided in contact with the positive current collecting sheet, and the first positive active material layer includes: a first binder made of polyacrylic acid having a molecular weight of 50,000 or less; and a second binder made of polyacrylic acid having a molecular weight of 300000 or more, and the first positive active material layer satisfies expressions (1) to (3):

$$\alpha \geq 1.7 \quad (1)$$

$$\beta \geq 0.9 \quad (2)$$

$$\alpha + \beta \leq 3.0 \quad (3)$$

where $\alpha$ is an additive amount of the first binder in parts by weight and $\beta$ is an additive amount of the second binder in parts by weight when a solid content except the first binder and the second binder in a solid content of the first positive active material layer is 100 parts by weight.

In this positive electrode sheet, the first positive active material layer of the positive active material layer, provided in contact with a contact surface of the positive current collecting sheet, contains the binder made of polyacrylic acid. From this point, the first positive active material layer is a dried layer of a water-based positive electrode paste containing water-based solvent. This water-based positive electrode paste exhibits alkalinity by the presence of the positive active material particles. Since the first binder and the second binder each exhibiting acidity are respectively contained in 1.7 pts. wt. or more ($\alpha \geq 1.7$) and 0.9 pts. wt. or more ($\beta \geq 0.9$), the pH of the resultant positive electrode paste is less than 9.0 (pH<9.0), so that the positive current collecting sheet made of aluminum is prevented from corroding. This can also prevent the surface of the positive current collecting sheet from getting rough due to corrosion and thus suppress resistance increase between the positive current collecting sheet and the positive active material layer.

In addition, since the second binder having good binding property is also contained, this can enhance the peel strength between the positive current collecting sheet and the positive active material layer and makes it less likely to cause defects resulting from peeling of the positive active material layer and others. To be concrete, the additive amount $\beta$ of the second binder having a molecular weight M of 300,000 or more is set to 0.9 or more ($\beta \geq 0.9$). Thus, the peel strength Ip of the first positive active material layer formed on the positive current collecting sheet can be obtained to be 40 N/m or more (Ip≥40 N/m).

Still further, the sum of the additive amount α of the first binder and the additive amount β of the second binder (i.e., a total amount of the binders), α+β, is limited to 3.0 pts. wt. or less (α+β≤3.0). The positive electrode sheet can be configured to suppress an increase in resistance of the first positive active material layer due to addition of the binders, an associated resistance increase of the positive electrode sheet, and hence an increase in battery resistance Rc. Specifically, a battery for evaluation of battery resistance having a configuration mentioned later can be reduced the battery resistance Rc to 730 mΩ or less (Rc≤730 mΩ).

The positive active material layer may be formed of only the first positive active material layer. Alternatively, the positive active material layer also may be formed of a plurality of layers including the first positive active material layer arranged for example such that a second positive active material layer is placed on the first positive active material layer.

DESCRIPTION OF EMBODIMENTS

First Embodiment

Figure 1:
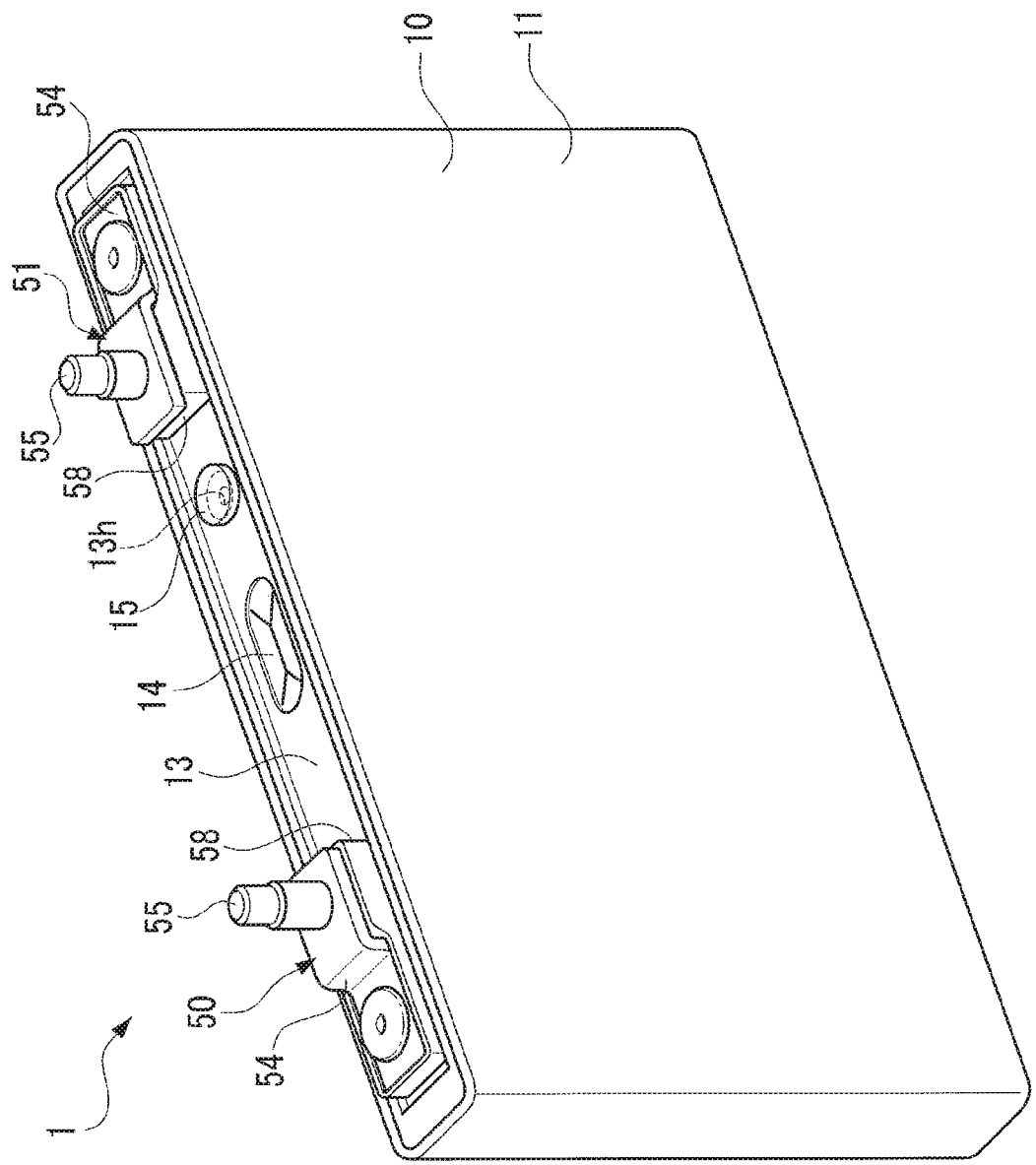
FIG. 1 is a perspective view of a lithium ion secondary battery in first and second embodiments.
Figure 2:
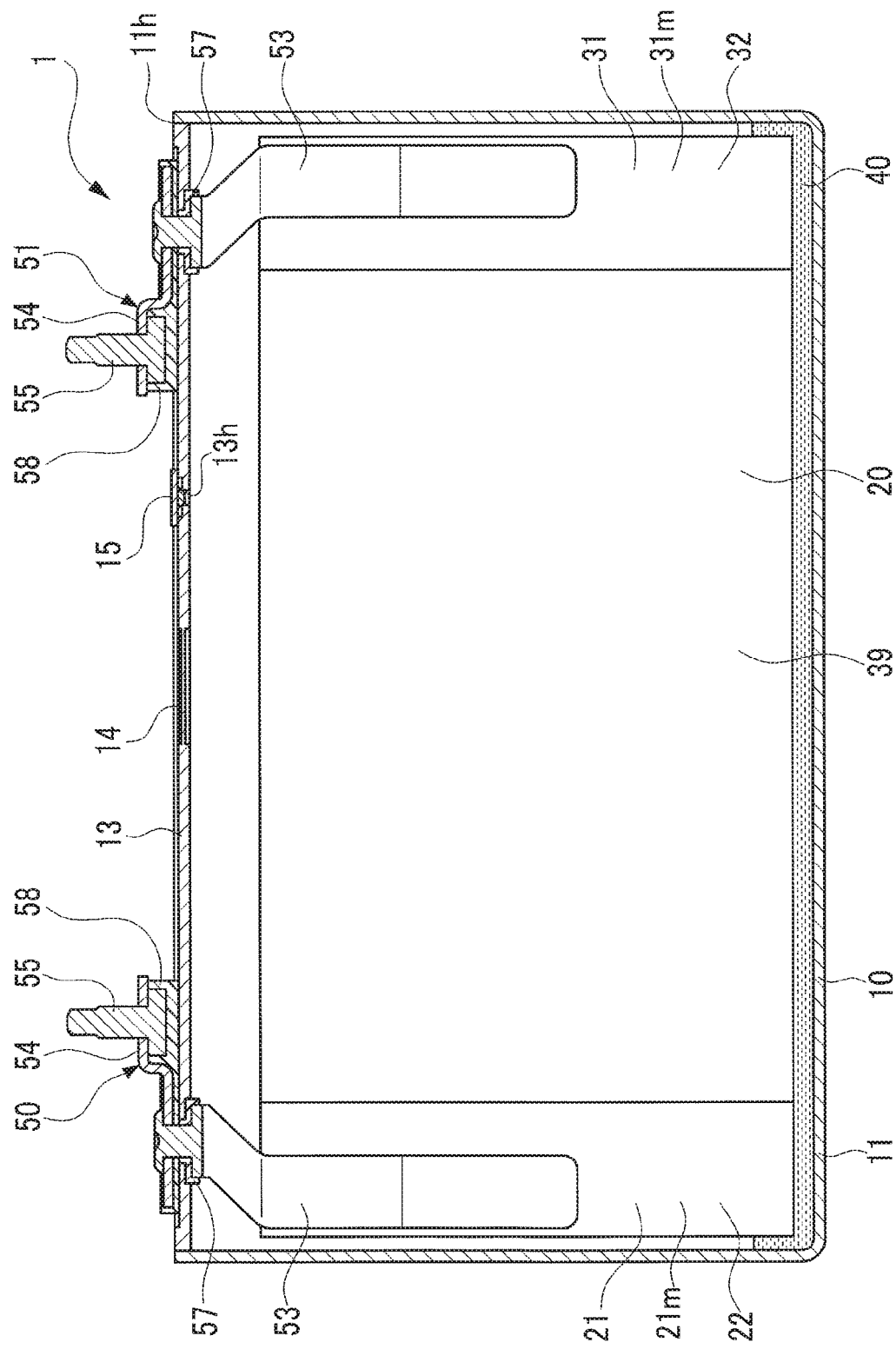
FIG. 2 is a vertical sectional view of the lithium ion secondary battery in the first and second embodiments.
Figure 3:
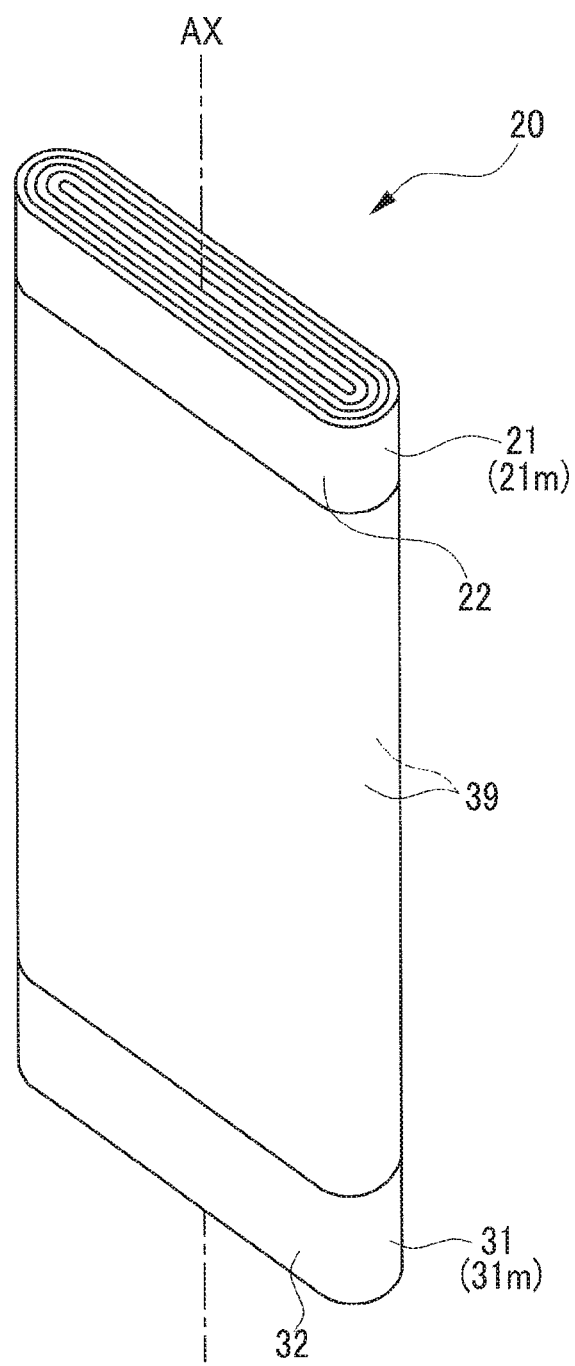
FIG. 3 is a perspective view of an electrode body of a battery in the first and second embodiment.
Figure 4:
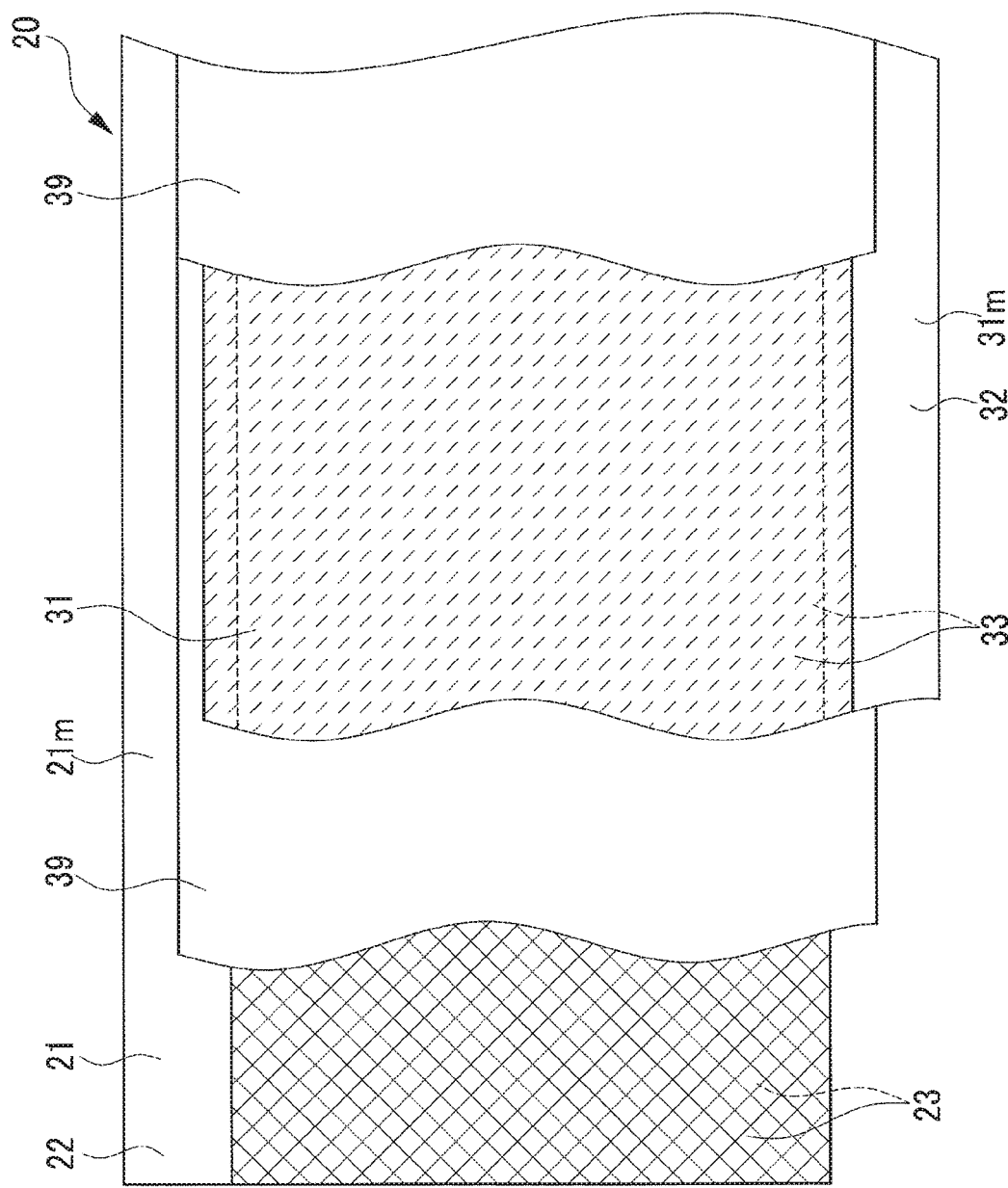
FIG. 4 is a developed view of the electrode body showing a state where a positive electrode sheet and a negative electrode sheet are overlapped by interposing therebetween separators in the first and second embodiments.
Figure 5:
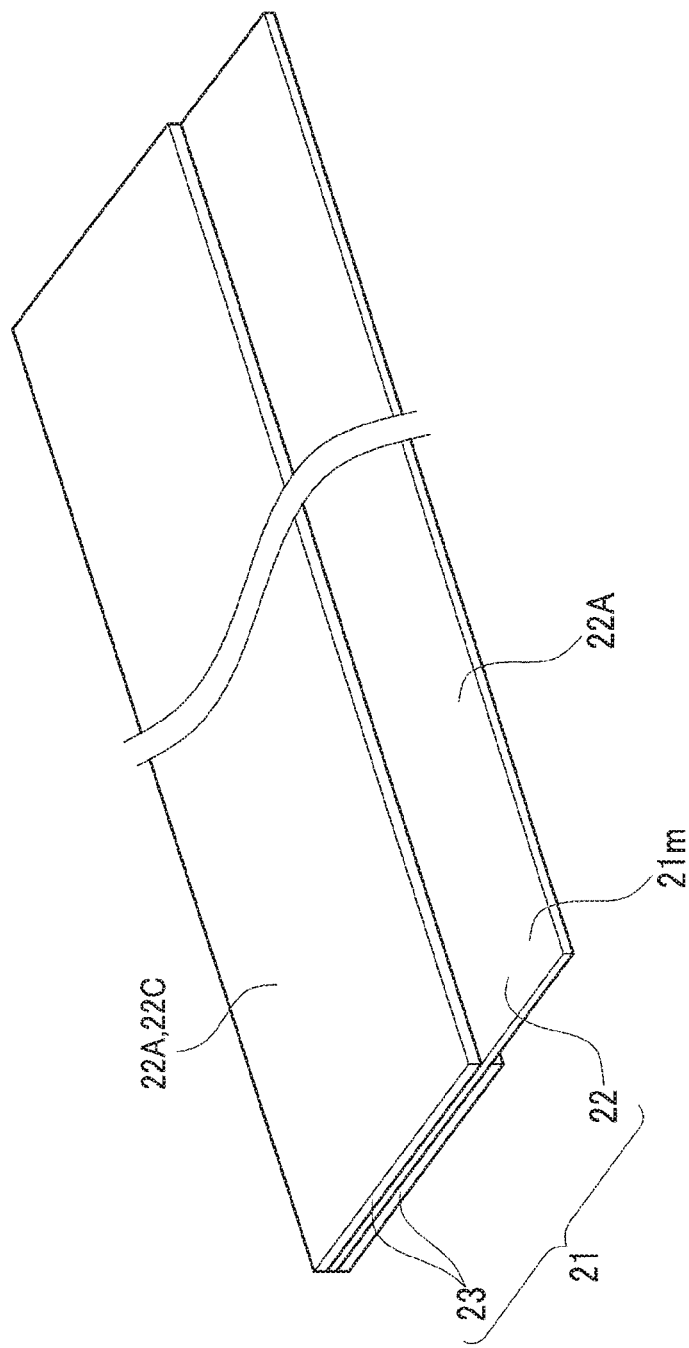
FIG. 5 is a perspective view of the positive electrode sheet in a developed state in the first and second embodiments.
Figure 6:
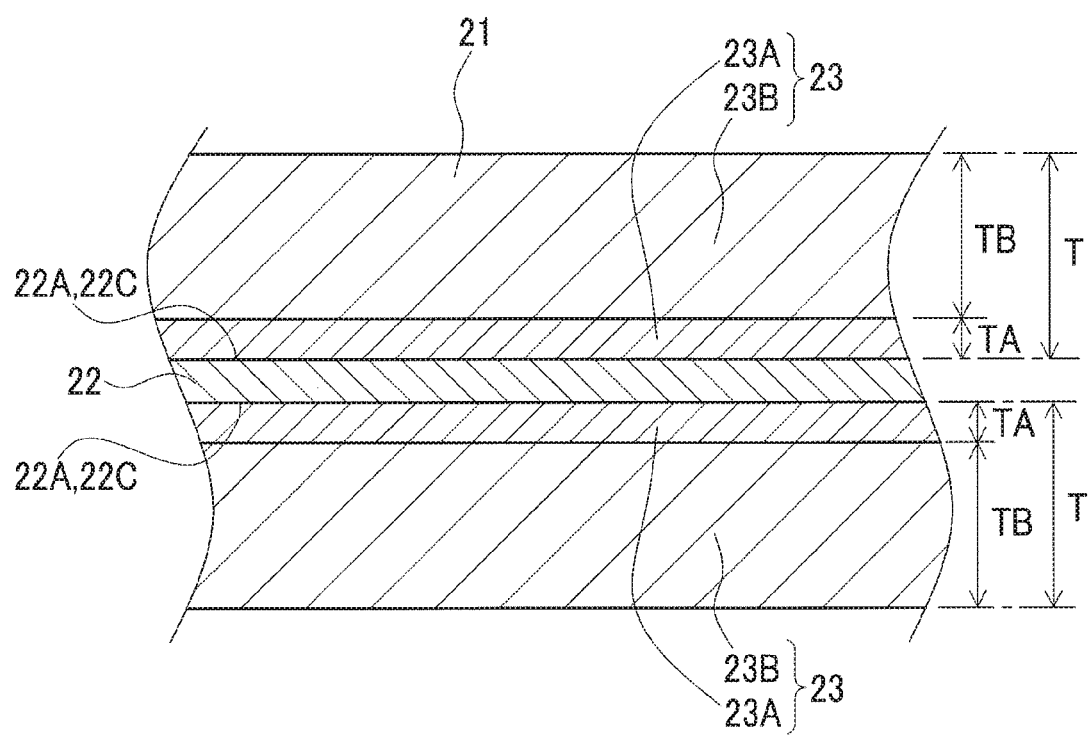
FIG. 6 is an enlarged sectional view of the positive electrode sheet in the first embodiment.

A detailed description of a first embodiment of the present disclosure will now be given referring to the accompanying drawings. FIGS. 1 and 2 show a lithium ion secondary battery (hereinafter, also simply referred to as a "battery") 1 in the present embodiment. FIG. 3 is a perspective view of a wound electrode body 20 of the battery 1. FIG. 4 shows a developed state of a positive electrode sheet, a negative electrode sheet, and separators, constituting the electrode body 20. FIG. 5 is a perspective view of the positive electrode sheet in a developed state. FIG. 6 is a sectional view of the positive electrode sheet.

This battery 1 is a rectangular, sealed, lithium ion secondary battery which will be mounted in a vehicle such as a hybrid vehicle and an electric vehicle. This battery 1 includes a battery case 10, the electrode body 20 and an electrolyte 40 which are contained in the battery case 10, a positive terminal 50 and a negative terminal 51 each supported in the battery case 10, and others.

The battery case 10 is made of metal (aluminum in the present embodiment) in a rectangular parallelepiped shape. This battery case 10 includes a case body member 11 having a rectangular parallelepiped box-like shape opening only on its upper side, and a case lid member 13 having a rectangular plate-like shape welded to the case body member 11 to close an opening 11h of the case body member 11. The case lid member 13 is provided with a safety valve 14 configured to be broken, i.e., valve-opened, when the internal pressure of the battery case 10 reaches a predetermined pressure. This case lid member 13 is formed with a liquid inlet 13h providing communication between inside and outside of the battery case 10. This liquid inlet 13h is hermetically sealed with a sealing member 15.

To the case lid member 13, a positive terminal 50 and a negative terminal 51, each of which is made up of an inner terminal member 53, an outer terminal member 54, and a bolt 55, are each fixedly provided through an inner insulation member 57 and an outer insulation member 58 each of which is made of resin. The positive terminal 50 is made of aluminum and the negative terminal 51 is made of copper. In the battery case 10, the positive terminal 50 is connected and electrically continuous with a positive current collecting part 21m of a positive electrode sheet 21 of the electrode body 20 mentioned later. The negative terminal 51 is connected and electrically continuously with a negative current collecting part 31m of a negative electrode sheet 31 of the electrode body 20.

The electrode body 20 will be described below with reference to FIGS. 1 to 6. This electrode body 20 has a flat shape wound about a winding axis AX and is enclosed in the battery case 10 so that the winding axis AX is oriented sideways. The electrode body 20 is made in such a way that the strip-shaped positive electrode sheet 21 and the strip-shaped negative electrode sheet 31 are wound about the winding axis AX so that those sheets 21 and 31 overlap by interposing therebetween each of a pair of strip-shaped separators 39, and this wound body is compressed in a flat shape.

In the positive electrode sheet 21, both surfaces 22A and 22A of a positive current collecting foil 22 made of a strip-shaped aluminum foil each include an active material layer coated portion (hereinafter, a "coated portion") 22C applied with a strip-shaped positive active material layer 23. The coated portion 22C is a region corresponding to a part of each surface 22A in its width direction and extending over in a longitudinal direction of each surface 22A. In the completed electrode body 20, those positive active material layers 23 opposite negative active material layers 33 of the negative electrode sheet 31 over their entire regions through each separator 39. Of the surfaces 22A and 22A of the positive current collecting foil 22, the coated portions 22C and 22C are in contact with corresponding positive active material layers 23 and 23 (first mixture layers 23A and 23A which will be described later) (see FIGS. 5 and 6).

Of the positive current collecting foil 22, an end portion at one side (a right lower side in FIG. 5) in the width direction is the positive current collecting part 21m in which the positive active material layers 23 are not provided in a thickness direction of the positive current collecting foil 22 so that the positive current collecting foil 22 is exposed. The foregoing positive terminal 50 is welded to this positive current collecting part 21m.

In the negative electrode sheet 31, similarly, both main surfaces of the negative current collecting foil 32 made of a strip-shaped copper foil are each provided with a strip-shaped negative active material layer 33 on a region corresponding to a part of each surface in its width direction and extending over in a longitudinal direction of each surface. These negative active material layers 33 contain negative active material particles, a binding agent, and a thickening agent. The present embodiment uses graphite particles as the negative active material particles, styrene butadiene rubber (SBR) as the binding agent, and carboxymethyl cellulose (CMC) as the thickening agent.

The foregoing positive electrode sheet 21 will be further described in detail below. The positive active material layers 23 and 23 of the positive electrode sheet 21 each contain a conductive auxiliary agent (acetylene black), a binder (polyacrylic acid), and a thickening agent (CMC) as well as the positive active material particles. The positive active material particles contained in each positive active material layer 23 are LiNiMn (nickel lithium manganite, $Li(Ni, Mn)_2O_4$) spinel particles. More specifically, each of the positive active material layers 23 has a total thickness T of 25 µm, including a first mixture layer 23A having a thickness TA of 3 µm formed on the positive current collecting foil 22 (the coated portion 22C) and a second mixture layer 23B having a thickness TB of 22 µm formed on the first mixture layer 23A.

The first mixture layer 23A is made in such a way that a first aqueous positive electrode paste PP1 mentioned later is applied and dried. This first mixture layer 23A contains a conductive auxiliary material (acetylene black) and a thickening agent (CMC) as well as the positive active material particles, and further contains two types of binders, that is, a first binder having a molecular weight M in a range of 100 to 50,000 and a second binder having a molecular weight M equal to or more than 300,000 (M≥300,000).

To be concrete, the first mixture layer 23A (the first positive electrode paste PP1) contains, as the first binder, polyacrylic acid with a molecular weight M of 50,000 in an additive amount α of 1.9 parts by weight (pts. wt.) and further, as the second binder, polyacrylic acid with a molecular weight M of 800,000 in an additive amount β of 0.9 pts. wt. Thus, the first mixture layer 23A totally contains the binders (polyacrylic acid) with a first total additive amount S1 (α+β) of 2.8 pts. wt. This weight ratio is a weight ratio determined assuming that the solid content of other components such as the positive active material particles in the first mixture layer 23A (the first positive electrode paste PP1) except for the first binder and the second binder is 100 pts. wt.

In contrast, the second mixture layer 23B is made in such a way that a second aqueous positive electrode paste PP2 mentioned later is applied and dried. This second mixture layer 23B contains, as with the first mixture layer 23A, the positive active material particles of LiNiMn spinel, a conductive auxiliary material (acetylene black), and a thickening agent (CMC). Furthermore, this second mixture layer 23B contains, as the binder, a third binder (0<γ).

Specifically, in the present embodiment, the second mixture layer 23B (the second positive electrode paste PP2) does not contain a binder corresponding to the first binder. Instead, the third binder having a molecular weight M of 800,000, corresponding to the second binder, is contained in an additive amount γ of 0.9 pts. wt., equal to the additive amount of the second binder in the first mixture layer 23A. Accordingly, the second mixture layer 23B contains a binder (polyacrylic acid) of a second total additive amount S2 (=γ) of 0.9 pts. wt., less than that in the first mixture layer 23A (S2<S1). The weight ratio is a weight ratio determined assuming that a solid content of other components such as the positive active material particles in the second mixture layer 23B (the second positive electrode paste PP2) except the third binder is assumed to be 100 pts. wt.

In the positive electrode sheet 21, as described above, the first mixture layer 23A of each positive active material layer 23 contains not only the first binder but also the second binder, so that the binding strength with the positive current collecting foil 22 (the coated portion 22C) is high and thus the peel strength Ip between the positive current collecting foil 22 and the first mixture layer 23A is high. To be concrete, the peel strength Ip is 82 N/m, which satisfies a relationship: Ip≥40 N/m. Therefore, when the positive electrode sheet 21 is to be wound to form the electrode body 20, defects such as peeling of the positive active material layer 23 (the first mixture layer 23A) from the positive current collecting foil 22 can be suppressed.

In contrast, the second mixture layer 23B of each positive active material layer 23 contains, as the third binder, only a binder having a relatively high molecular weight (molecular weight M=800,000) providing good binding property. In addition, the second total additive amount S2 (=γ=0.9 pts. wt.) is set to be smaller than the first total additive amount S1 (=α+β=2.8 pts. wt.) of the first mixture layer 23A (S2<S1). Accordingly, while the positive electrode sheet 21 has the high binding property and the adhesion property with the first mixture layer 23A, the positive electrode sheet 21 can provide low resistance by suppressing an increase in volume specific resistance of the second mixture layer 23B by addition of the binder than that of the first mixture layer 23A, and also reducing the resistance generated in the second mixture layer 23B and hence in the positive active material layer 23.

In the positive electrode sheet 21 of the battery 1 in the first embodiment, furthermore, the total thickness T of each the positive active material layer 23 is set to 25 µm. The thickness TA of the first mixture layer 23A which is relatively high in volume specific resistance due to a large additive amount (the first total additive amount S1) is 3.0 µm or more, which is one third or less of the total thickness T, and further, in a range of 3.0 to 7.0, specifically, TA=3.0 µm. In contrast, the thickness TB of the second mixture layer 23B which is relatively low in volume specific resistance because of a small additive amount (the second total additive amount S2) is 22 µm that is thicker than the thickness TA of the first mixture layer 23A and further more than double (TB≥TA, TB>2TA).

As described above, since the percentage of the second mixture layer 23B having a relatively low volume specific resistance in the positive active material layer 23 is set large, the positive electrode sheet 21 of the battery 1 in the first embodiment can be configured as a positive electrode sheet 21 having lower resistance.

In the battery 1 in the first embodiment, accordingly, using the foregoing positive electrode sheet 21, resistance increase of the positive current collecting foil 22 due to corrosion is suppressed and thus defects resulting from peeling of the positive active material layer 23 and other reasons are less likely to occur. Therefore, the battery 1 can be achieved with high reliability. In addition, the battery 1 with low battery resistance can be provided by use of the positive electrode sheet 21 with low resistance.

Next, a method for producing the positive electrode sheet 21 will be explained. The first positive electrode paste PP1 is first prepared. To be concrete, water, 0.9 pts. wt. of CMC as the thickening agent, 5.7 pts. wt. of acetylene black as the conductive auxiliary agent, and the first binder are kneaded together into a paste with a planetary mixer. Into this paste, additionally, the second binder is charged and kneaded. Further, positive active material particles made of LiMn spinel (93.4 pts. wt.) is charged in that paste and this mixture is agitated. In this way, the first positive electrode paste PP1 (a solid content of 55%) is prepared.

In the present embodiment, the first positive electrode paste PP1 contains a first binder with a molecular weight M in a range of 100 to 50,000 and a second binder with a molecular weight M of 300,000 or more added as the polyacrylic acid forming the binder. Specifically, when other solid content is assumed to be 100 pts. wt., the polyacrylic acid with a molecular weight M of 50,000, as the first binder, is added in an additive amount α of 1.9 pts. wt. As the second binder, the polyacrylic acid with a molecular weight M of 8000,000 is similarly added in an additive amount β of 0.9 pts. wt. In brief, the first binder and the second binder are added in a first total additive amount S1 (=α+β) of 2.8 pts. wt. in all.

Meanwhile, when LiNiMn spinel forming the positive active material particles are mixed with water which is solvent, this mixture generates hydrogen and ionizes Li ions and also the solvent itself and the positive electrode paste containing this solvent exhibit strong alkalinity exceeding pH 9.0 (reaching pH 12.0). When this positive electrode paste is applied to the positive current collecting foil 22, the resistance between the positive current collecting foil 22 and the positive active material layer 23 may increase. Aluminum forming the positive current collecting foil may be corroded under alkaline conditions and, particularly, is likely to corrode under alkaline conditions exceeding pH 9.0. Accordingly, when a strong alkaline positive electrode paste is applied to the positive current collecting foil 22, it is conceived that a portion (the coated portion 22C) of the surface 22A of the positive current collecting foil 22 is corroded until the positive electrode paste is completely dried, resulting in a roughened surface. In addition, the hydrogen generated due to corrosion causes a deterioration in tight-contact property between the positive current collecting foil 22 and the positive active material layer 23, resulting in an increased resistance between the positive current collecting foil 22 and the positive active material layer 23.

In the present embodiment, in contrast, the first positive electrode paste PP1 is added with the polyacrylic acid as the binder. When the polyacrylic acid is dispersed in water which is a solvent, $H^+$ of carboxyl group (COOH) is ionized, and the polyacrylic acid acidifies. A polyacrylic acid with a small molecular weight among some types of polyacrylic acids exhibits relatively strong acidity. Therefore, in the first positive electrode paste PP1 added with this binder, the alkalinity resulting from the positive active material particles is reduced. The first positive electrode paste PP1 in the present embodiment is pH 9.0 or less, concretely, pH 8.6. Accordingly, as described later, even when this first positive electrode paste PP1 is applied to the positive current collecting foil 22, the positive current collecting foil 22 is not corroded.

In the present embodiment, furthermore, the second positive electrode paste PP2 is also prepared. To be concrete, water, 0.9 pts. wt. of CMC which is a thickening agent, 5.7 pts. wt. of acetylene black as a conductive auxiliary agent, and the third binder are kneaded together into a paste with a planetary mixer. Into this paste, positive active material particles made of LiNiMn spinel (93.4 pts. wt.) are charged and agitated. In this way, the second positive electrode paste PP2 (a solid content of 55%) is prepared.

In the present embodiment, the second positive electrode paste PP2 is added with the polyacrylic acid corresponding to the third binder in a smaller amount than in the first positive electrode paste PP1.

Specifically, when the solid content of the components other than the third binder is assumed to be 100 pts. wt., the polyacrylic acid with a molecular weight M of 800,000, which is more than a molecular weight M of 300,000, is added as the third binder in γ=0.9 pts. wt. (the second total additive amount S2=γ=0.9 pts. wt.). In the second positive electrode paste PP2 added with only the third binder, the alkalinity of the polyacrylic acid is not sufficiently reduced, so that the second positive electrode paste PP2 is pH 9.0 or more, concretely, exhibits a strong alkalinity of pH 11.6. Accordingly, when this second positive electrode paste PP2 is directly applied to the positive current collecting foil 22, the surface 22A of the positive current collecting foil 22 gets corroded.

Figure 7:
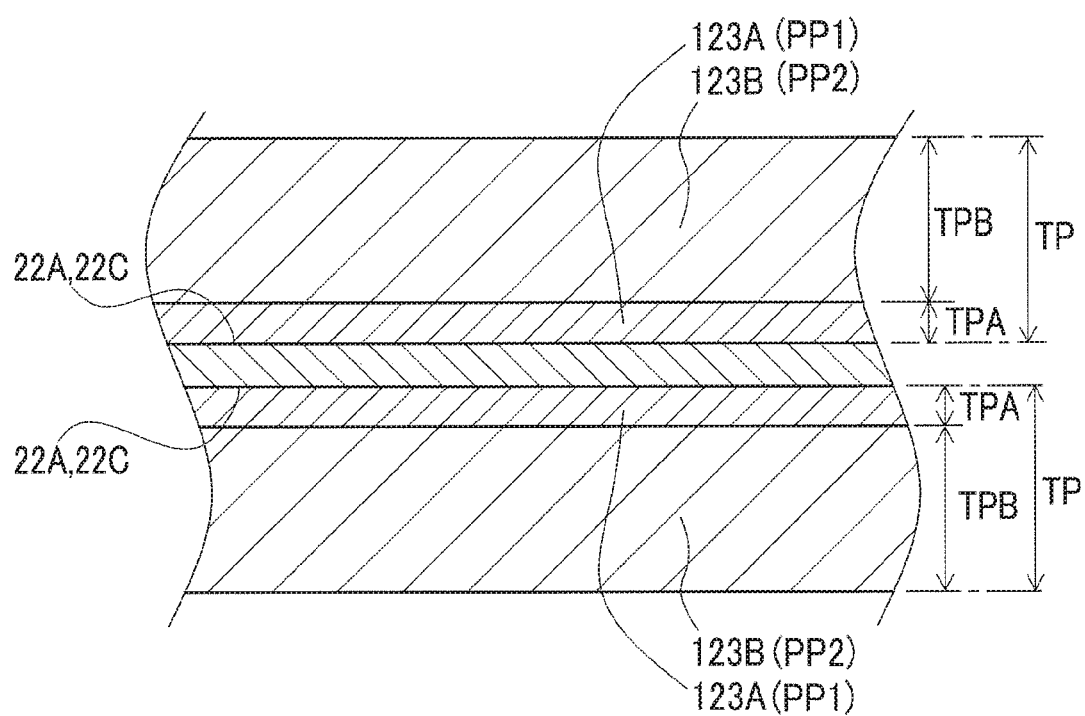
FIG. 7 is an explanatory view showing a state that a positive electrode paste is applied to a surface of a positive current collecting foil in the first embodiment.

Therefore, as shown in FIGS. 6 and 7, the first positive electrode paste PP1 is applied to each of the coated portions 22C and 22C of the surfaces 22A and 22A of the positive current collecting foil 22 having a thickness of 15 μm, thereby forming the first positive electrode paste layers 123A and 123A each having a thickness TPA (resulting in the thickness TA of the first mixture layer 23A=3.0 μm). Further, those first positive electrode paste layers are dried by hot air at 100° C., forming the first mixture layers 23A and 23A.

Successively, by use of a coater, the second positive electrode paste PP2 is applied to each of the first mixture layers 23A and 23A, thereby forming the second positive electrode paste layers 123B and 123B each having a thickness TPB (resulting in the thickness TB of the second mixture layer 23B=22 μm) (total thickness TP). Further, those second positive electrode paste layers are dried by hot air at 100° C., forming the second mixture layers 23B and 23B to produce the positive electrode sheet 21. This positive electrode sheet 21 is pressed in its thickness direction to compact the positive active material layers 23 and 23. After compacting, each of the positive active material layers 23 and 23 has a thickness T of 25 μm. Each positive active material layer 23 has a weight per unit area of 6.4 mg/cm$^2$ and a density of 2.4 g/cm$^3$.

After this positive electrode sheet 21 is completed, the positive electrode sheet 21, the negative electrode sheet 31 separately made by a known method, and the separators 39 are wound together and pressed into a flat shape, thereby forming the electrode body 20. To this electrode body 20, the positive terminal 50 and the negative terminal 51 are connected, and further this electrode body 20 is enclosed in the battery case 10. Thus, the battery 1 is produced. The electrolyte 40 is then poured in the battery 1 through the liquid inlet 13h. The battery 1 is subjected to initial charge and then the liquid inlet 13h is hermetically closed with the sealing member 15. In this manner, the battery 1 is completed.

According to the method for producing the positive electrode sheet 21 described above, the first positive electrode paste PP1 includes the second binder having high binding strength and relatively high molecular weight. This configuration can achieve high peel strength of the first positive active material layer as compared with the case of adding only the first binder as the binder. To be concrete, the additive amount β of the second binder having a molecular weight M of 300,000 is set to 0.9 or more (β≥0.9). Thus, the peel strength Ip of the first positive active material layer formed on the positive current collecting sheet can be set to 40 N/m or more (Ip≥40 N/m). Since the present embodiment uses the second binder having a molecular weight M of 800,000, the peel strength Ip can be further enhanced to 60 N/m or more (Ip≥60 N/m).

In this method for producing the positive electrode sheet, the first positive electrode paste exhibiting alkalinity deriving from the positive active material particles contains 1.7 pts. wt. or more (α≥1.7) of the first binder that is acid and has a molecular weight M of 50,000 or less in addition to the second binder, so that the hydrogen ion concentration index (pH) of the first positive electrode paste decreases to below 9.0 (pH<9.0). Thus, even when the first positive electrode paste is applied to the positive current collecting sheet made of aluminum, the positive current collecting sheet is less likely to corrode. This prevents resistance increase between the positive current collecting sheet and the positive active material layer (the first positive active material layer) caused in association of the surface of the positive current collecting sheet corrodes.

Furthermore, the sum of the additive amount α of the first binder and the additive amount β of the second binder, i.e., α+β (a total binder amount), is limited to 3.0 pts. wt. or less (α+β≤3.0) (α+β=2.8 in the present embodiment). Accordingly, this can suppress resistance increase of the positive electrode sheet in association with resistance increase of the first positive active material layer by addition of the binder, and hence increase battery resistance Rc. To be concrete, in the battery for estimation of battery resistance having the configuration mentioned later, the battery resistance Rc can be reduced to 730 mΩ or less (Rc≤730 mΩ).

Second Embodiment

Figure 8:
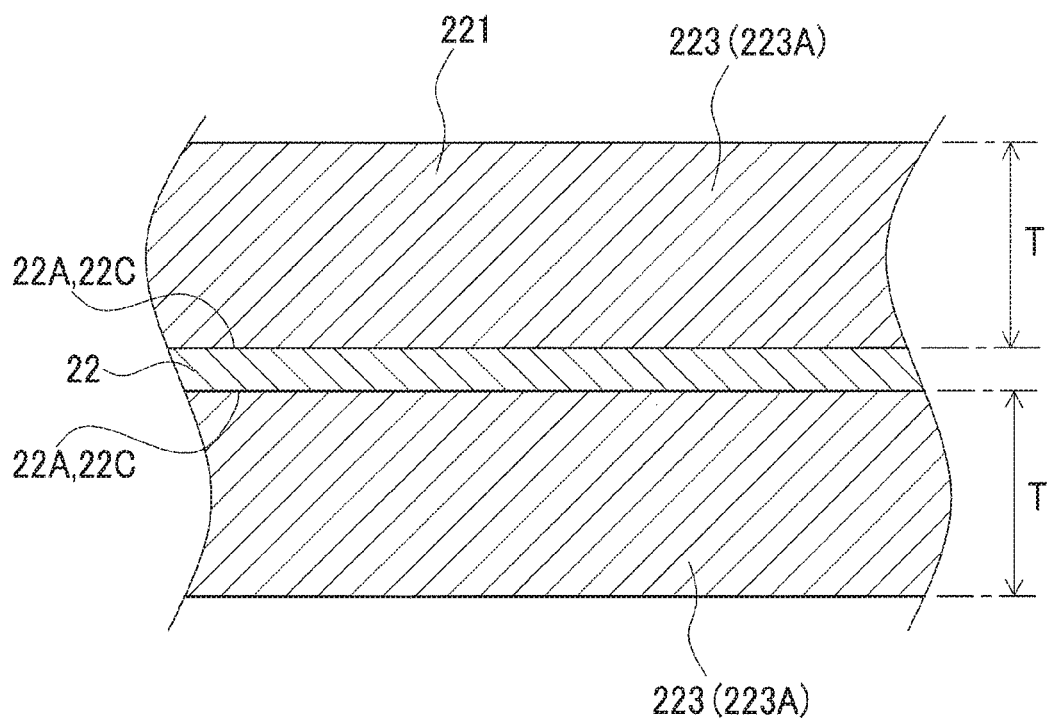
FIG. 8 is an enlarged sectional view of a positive electrode sheet in the second embodiment.

The above-described first embodiment uses the positive electrode sheet 21 including the positive active material layer 23 having a two-layer structure in which the second mixture layer 23B is formed on the first mixture layer 23A (see FIG. 6). As an alternative, as shown in FIG. 8, the battery 1 can be produced using a positive electrode sheet 221 having a single layer structure in which a positive active material layer 223 is formed of only a first mixture layer 223A. This positive electrode sheet 221 has only to be produced in such a way that the first positive electrode paste PP1 is applied with a thickness T of 25 μm to each of the coated portions 22C and 22C of the surfaces 22A and 22A of the positive current collecting foil 22 having a thickness of 15 μm by use of a coater as in the first embodiment, and the applied first positive electrode paste PP1 is dried by hot air, thereby forming the first mixture layers 223A and 223A (the positive active material layers 23 and 23).

In even this positive electrode sheet 221, each positive active material layer 223 (each first mixture layer 223A) contains not only the first binder with a molecular weight M of 50,000, but also the second binder with a molecular weight M of 800,000. Thus, the positive active material layers 223 can provide high adhesion property with the positive current collecting foil 22 (the coated portions 22C) and high peel strength Ip between the positive current collecting foil 22 and the first mixture layers 223A can be obtained. To be concrete, the resultant peel strength Ip is 40 N/m or more (Ip≥40 N/m) and further 60 N/m or more (Ip≥60 N/m). Therefore, when the positive electrode sheet 221 is wound to form the electrode body 20, it is possible to suppress defects such as peeling of the second positive active material layer(s) 223 (the first mixture layer(s) 223A) from the positive current collecting foil 22.

(Study A: Relationship between molecular weight and additive amount of polyacrylic acid and pH of positive electrode paste added with the polyacrylic acid)

A study was made by using six types of polyacrylic acid different in molecular weight to investigate a relationship between the additive amount of each polyacrylic acid and pH of positive electrode paste added with the polyacrylic acid. To be concrete, as shown in Table 1 and a graph in FIG. 9, six types of polyacrylic acids respectively having a molecular weight M of 5,000, 10,000, 50,000, 300,000, 800,000, and 1,500,000 were prepared. As with the foregoing first positive electrode paste PP1, positive electrode paste were prepared by use of positive active material particles of LiNiMn spinel and each pH was measured.

When compositions of the positive active material particles and others were set, as in the first embodiment, at a ratio by weight expressed by: Positive active material particles:Conductive auxiliary agent (Acetylene black):Thickening agent (CMC)=93.4:5.7:0.9, and their solid content was 100 pts. wt., the polyacrylic acid of each molecular weight was added at three levels; 0 pts. wt. (Not added), 1.0 pts. wt., and 2.0 pts. wt.

TABLE 1

| Additive amount of Binder (parts by weight) | Molecular amount of Polyacrylic acid (Binder) | | | | | |
|---|---|---|---|---|---|---|
| | 5,000 | 10,000 | 50,000 | 300,000 | 800,000 | 1,500,000 |
| 0.0 | 12.0 | 12.0 | 12.0 | 12.0 | 12.0 | 12.0 |
| 1.0 | — | — | 10.3 | 11.4 | 11.5 | — |
| 2.0 | 8.63 | 8.62 | 8.80 | 10.1 | 10.7 | 11.5 | pH of Positive electrode paste

Figure 9:
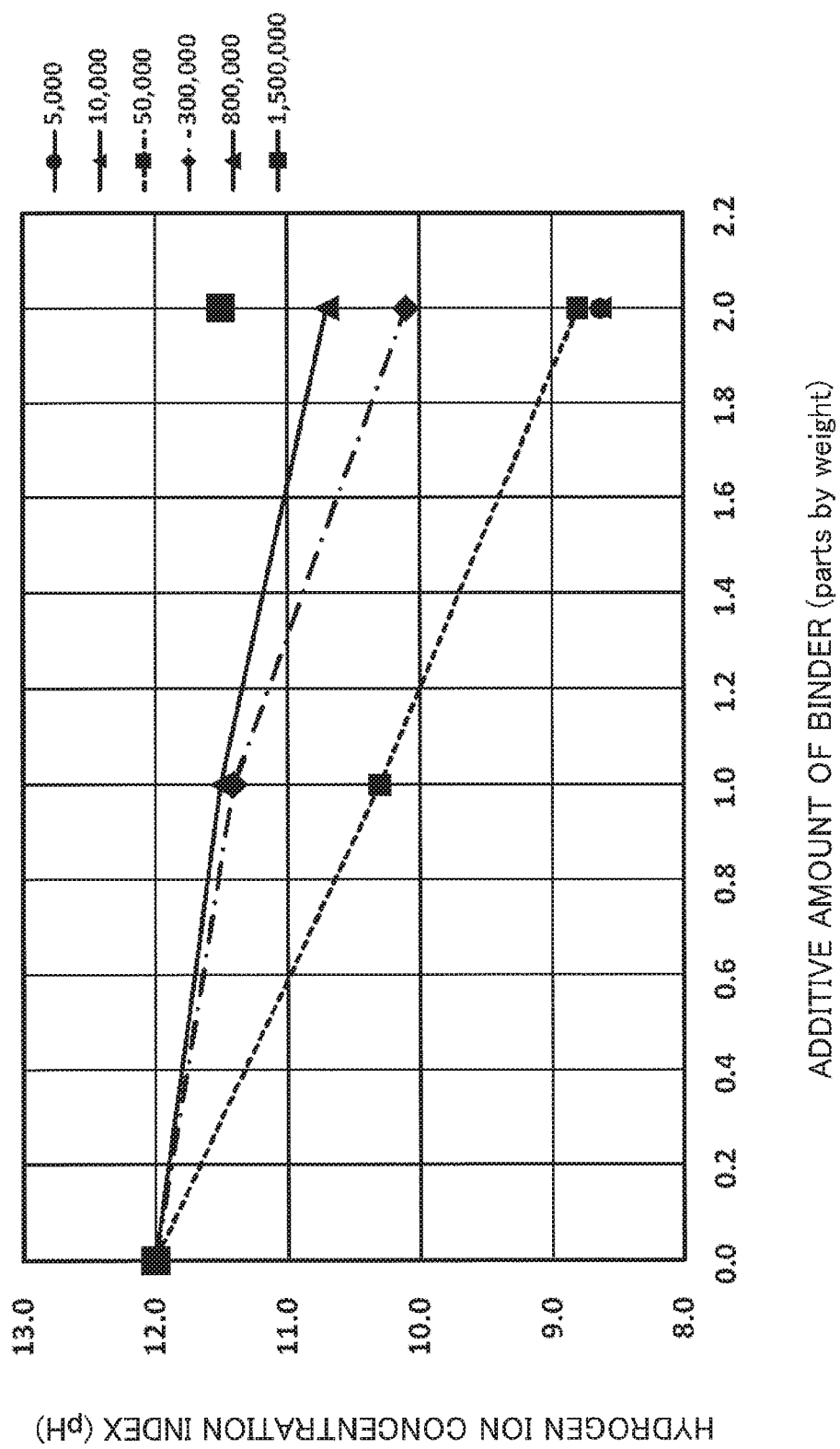
FIG. 9 is a graph showing a relationship between molecular weight and additive amount of binder (polyacrylic acid) and pH of positive electrode paste.

According to Table 1 and FIG. 9, it is shown that the pH of the positive electrode paste is 12.0 when no polyacrylic acid is added (additive amount α+β=0 pts. wt.). In contrast thereto, the pH of the positive electrode paste decreases when the polyacrylic acid is added. This is based on that each polyacrylic acid exhibits acidity. However, as the polyacrylic acid having a lower molecular weight exhibits stronger acidity, and the addition of the polyacrylic acid might greatly decrease the pH of the strong alkaline positive electrode paste. It is, on the other hand, revealed that when even the polyacrylic acid having a molecular weight M of 1,500,000 is added in an amount of 2.0 pts. wt., the pH can be reduced from 12.0 to 11.5.

This result shows that, when the pH of the positive electrode paste is to be adjusted to 9.0 or less (pH≤9.0) by addition of only polyacrylic acid having a molecular weight M of 50,000 or less, this polyacrylic acid has to be added in an amount of α=1.9 pts. wt. or more (see FIG. 9).

However, in the case of adding not only the polyacrylic acid having a molecular weight M of 50,000 or less but also polyacrylic acid having a high molecular weight M of 300,000 or more in consideration of peel strength as shown in Study B mentioned later in (β=0.9 pts. wt. or more (β>0.9), resultant pH-reduction effect is slightly obtained. In view of contribution of this effect, when the polyacrylic acid having a high molecular weight M of 300,000 or more is added in β=0.9 pts. wt. or more and the pH of the positive electrode paste is set to 9.0 or less (pH≤9.0), the polyacrylic acid having a molecular weight M of 50,000 or less has only to be added in α=1.7 pts. wt. or more (α≥1.7).

(Study B: Relationship between molecular weight and additive amount of polyacrylic acid and peel strength between positive mixture layer added with this polyacrylic acid and positive current collecting foil)

A study was made by using several types of polyacrylic acids different in molecular weight to investigate a relationship between the additive amount of each polyacrylic acid and the peel strength Ip between the positive mixture layer added with the polyacrylic acid and the positive current collecting foil. To be concrete, as shown in Table 2 and a graph in FIG. 10, six types of polyacrylic acids respectively having a molecular weight M of 5,000, 10,000, 50,000, 300,000, 800,000, and 1,500,000 were prepared. As with the first positive electrode paste PP1 mentioned above, a positive electrode paste was produced by use of positive active material particles of LiNiMn spinel, and then this positive electrode paste was applied to the positive current collecting foil and dried, forming the positive mixture layer. This positive electrode sheet was subjected to measurement of the peel strength Ip between the positive mixture layer and the positive current collecting foil.

When compositions of the positive active material particles and others were set, as in the first embodiment and the study A, at a ratio by weight expressed by: Positive active material particles:Conductive auxiliary agent (Acetylene black):Thickening agent (CMC)=93.4:5.7:0.9, and their solid content was 100 pts. wt., the polyacrylic acid of each molecular weight was added at three levels; 0.5 pts. wt., 1.0 pts. wt., and 2.0 pts. wt. Further, only for a molecular weight M of 800,000, investigation was also conducted on the case where polyacrylic acid was added in 2.8 pts. wt.

TABLE 2

| Additive amount of Binder (parts by weight) | Molecular amount of Polyacrylic acid (Binder) | | | | | |
|---|---|---|---|---|---|---|
| | 5,000 | 10,000 | 50,000 | 300,000 | 800,000 | 1,500,000 |
| 0.5 | 0.10 | 0.11 | 0.78 | 0.91 | 1.8 | 2.5 |
| 1.0 | 0.45 | 1.2 | 5.2 | 52 | 85 | 150 |
| 2.0 | 0.61 | 2.4 | 28 | 120 | 170 | 230 |
| 2.8 | — | — | — | — | 230 | — |

Figure 10:
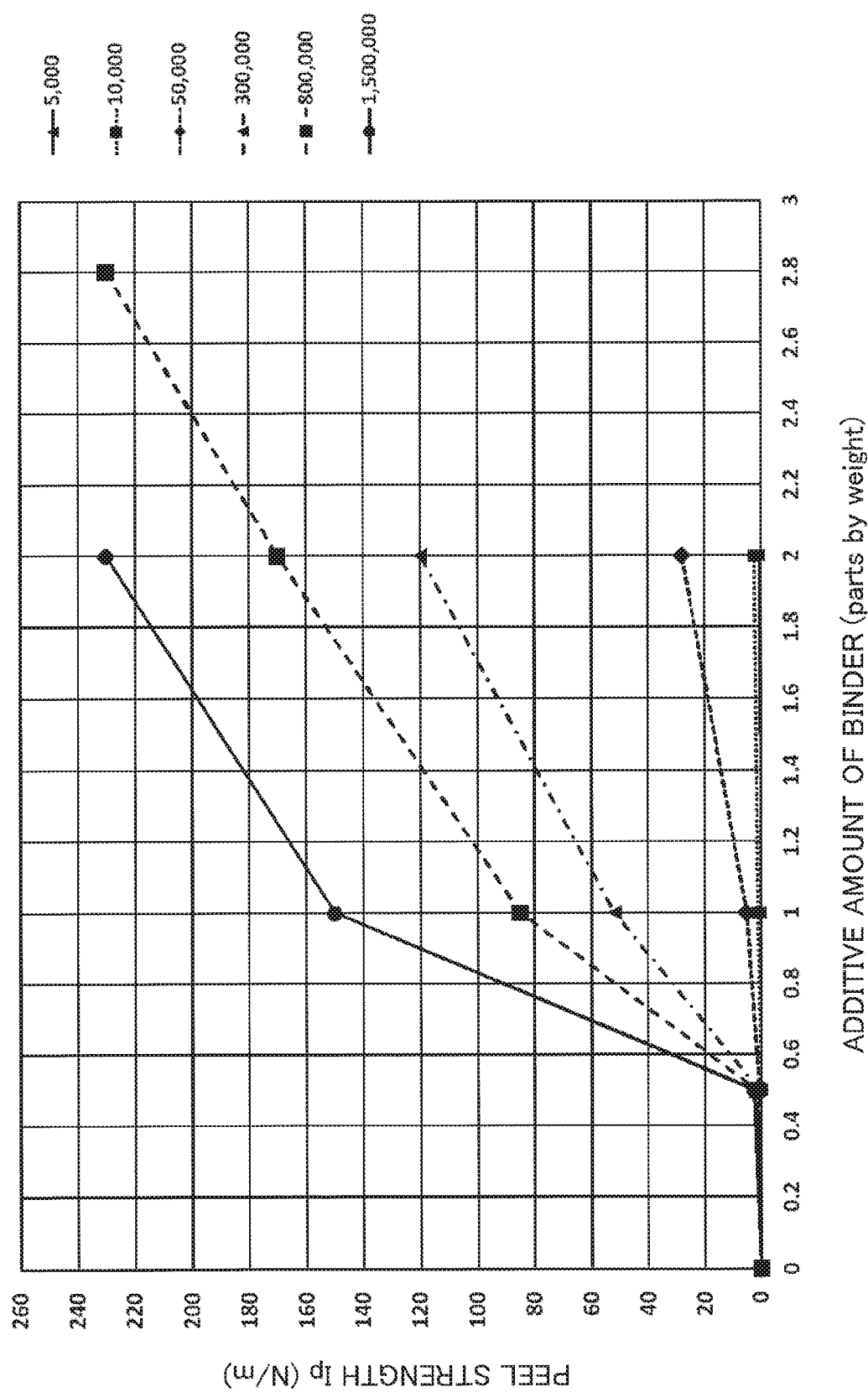
FIG. 10 is a graph showing a relationship between molecular weight and additive amount of binder (polyacrylic acid) and peel strength between a positive mixture layer having the binder added therein and a positive current collecting foil.

Peel strength (N/m) between Positive current collecting foil and Positive active material layer As shown in Table 2 and the graph in FIG. 10, it is revealed that, in the positive mixture layer added with the polyacrylic acid, the molecular weight M is higher, the peel strength Ip between the positive mixture layer and the positive current collecting foil becomes higher. To be concrete, it is found that, when the polyacrylic acid having a high molecular weight M of 300,000 or more is added in β=0.9 pts. wt. or more, the peel strength Ip of 40 N/m or more (Ip≥40 N/m) is obtained. In the polyacrylic acid having a molecular weight M of 50,000, in contrast, even it is added in 2.0 pts. wt., the peel strength Ip decreases below 40 N/m. Thus, for lower molecular weight (M=5,000 and 10,000), even when the polyacrylic acid is added in 2.0 pts. wt., this addition hardly contribute to improvement of peel strength Ip.

It is further shown that, in any molecular weight, the additive amount of the binder that is 0.5 pts. wt. or less hardly contributes to improvement of peel strength Ip. To obtain the peel strength Ip of 40 N/m or more, it is necessary to add the polyacrylic acid with a molecular weight M of 300,000 in 0.9 pts. wt. or more, the polyacrylic acid with a molecular weight M of 800,000 in 0.75 pts. wt. or more, or the polyacrylic acid with a molecular weight M of 1,500,000 in 0.65 pts. wt. or more.

Accordingly, it is found that, when the polyacrylic acid having a molecular weight M of 300,000 or more is added in 0.9 pts. wt. or more to the positive electrode paste (the positive mixture layer), good binding property and adhesion property with a peel strength Ip of 40 N/m or more can be obtained. As shown in the study A, when only the polyacrylic acid having a relatively large molecular weight is added, the pH of the positive electrode paste exceeds 9.0, so that a current collecting foil applied with this positive electrode paste is corroded. However, it is conceived that the binding strength of the positive mixture layer provides improved binding strength and thus the peel strength Ip becomes a good value.

When the molecular weight M of polyacrylic acid exceeds 2,000,000, however, the viscosity of the positive electrode paste becomes too high, making it difficult to mix and disperse the positive active material particles and others. Further, the flexibility of the binder also decreases. Consequently, the positive mixture layer having the binder mixed therein becomes so hard as to likely cause cracks in the positive mixture layer at the time of winding a positive electrode sheet together with a negative electrode sheet and others. Such defects are undesirable.

In the case of a molecular weight M of 50,000 or less, the polyacrylic acid poorly functions as a binder, which could not contribute to improvement of peel strength Ip. However, as described above, it can function as an acid material that neutralizes alkali. Therefore, the polyacrylic acid has only to have a molecular weight M of at least 100 or more. The polyacrylic acid having a molecular weight M of 50,000 or less can also function as a dispersing agent to disperse positive active material particles in the positive electrode paste.

It is to be noted that the peel strength Ip of the positive mixture layer formed on the positive current collecting foil is concretely a value obtained by measurement using a method of 90-degree peeling test specified in JIS K6854-1: 1999 (18510-1:1990) using a tester, TENSILON universal testing machine (RTC-1150A) made by ORIENTEC Corporation.

(Study C: Relationship between "Molecular weight and total additive amount of polyacrylic acid" and "Battery resistance of a battery using a positive electrode sheet having a positive mixture layer added with the polyacrylic acid")

A study was made by using together several types of polyacrylic acids different in molecular weight to investigate a relationship between the total additive amount of the polyacrylic acids and the battery resistance Rc (me) of a battery using a positive electrode sheet added with the polyacrylic acids. To be concrete, as shown in Table 3 and a graph in FIG. 11, three types of polyacrylic acids respectively having a molecular weight M of 50,000, 800,000, and 1,500,000 were prepared. As with the foregoing first positive electrode paste PP1, a positive electrode paste was prepared by use of positive active material particles of LiNiMn spinel. This positive electrode paste was applied and dried on a positive current collecting foil, forming a positive mixture layer (thickness: 25 μm). A battery for evaluation having a predetermined shape produced by use of this positive electrode sheet was subjected to measurement of battery resistance Rc. In the study C, when compositions of each positive electrode paste (each positive mixture layer) were set, as with the foregoing embodiment and the studies A and B, at a ratio by weight expressed by: Positive active material particles:Conductive auxiliary agent (Acetylene black):Thickening agent (CMC)=93.4:5.7:0.9, and their solid content was 100 pts. wt., the polyacrylic acid of each molecular weight was added at three different levels of total additive amount; 2.0 pts. wt., 2.8 pts. wt., and 4.0 pts. wt.

As the binder (polyacrylic acid), three patterns of combinations of molecular weight were investigated; specifically, only a molecular weight M of 50,000, a combination of a molecular weight M of 50,000 and a molecular weight M of 800,000, and a combination of a molecular weight M of 50,000 and a molecular weight M of 1,500,000. In the two different combinations of polyacrylic acid (the combination of molecular weights M of 50,000 and 800,000 and the combination of molecular weights M of 50,000 and 1,500,000), the additive amount of a polyacrylic acid with a lower molecular weight and a polyacrylic acid of a higher molecular weight was set at a ratio of 2:1. For instance, for a total additive amount of 2.0 pts. wt., the polyacrylic acid of a lower molecular weight was 1.3 pts. wt. and the polyacrylic acid of a higher molecular weight was 0.7 pts. wt. For a total additive amount of 2.8 pts. wt., the polyacrylic acid of a lower molecular weight was 1.9 pts. wt. and the polyacrylic acid of a higher molecular weight was 0.9 pts. wt. For a total additive amount of 4.0 pts. wt., the polyacrylic acid of a lower molecular weight was 2.7 pts. wt. and the polyacrylic acid of a higher molecular weight was 1.3 pts. wt.

The battery for evaluation is produced in the following manner. A positive electrode sheet is prepared in a configuration that one surface of a positive current collecting foil having a size of 60×45 mm is provided with a positive mixture layer of 45 mm square, except for a positive current collecting part of 15×45 mm to expose the current collecting foil. Similarly, an negative electrode sheet is prepared in a configuration that one surface of a negative current collecting foil having a size of 61×46 mm is formed with a negative mixture layer of 46 mm square, except for a negative current collecting part of 15×46 mm formed by exposing the current collecting foil. After extraction electrode plates are individually welded to the positive current collecting part and the negative current collecting part, the positive electrode sheet and the negative electrode sheet are stacked so that respective positive mixture layer and negative mixture layer are opposite with respect to a separator and the negative mixture layer protrudes from the periphery of the positive mixture layer. Thereafter, those positive electrode sheet and negative electrode sheet are covered by a laminated film so that a part of each of their extraction electrode plates is uncovered, and a peripheral edge portion of the laminated film is sealed except for a part thereof. Then, the battery is heated and dried, and an electrolyte is poured therein. The unsealed part of the peripheral edge portion of the laminated film is then sealed. Thus, a battery for evaluation (an "evaluation battery") is completed.

This evaluation battery is subjected to initial charge and then discharge at multiple stages. Based on a voltage drop caused when the battery is discharged for 10 seconds at each discharge stage, IV resistance (mΩ) is measured and set as battery resistance Rc.

TABLE 3

| Total additive amount of Binder (parts by weight) | Molecular amount of Polyacrylic acid (Binder) | | |
|---|---|---|---|
| | 50,000 | 50,000 + 800,000 | 50,000 + 1,500,000 |
| 2.0 | 670 | 670 | 680 |
| 2.8 | 710 | 720 | 720 |
| 4.0 | 800 | 810 | 800 |

Battery resistance (mΩ) of Evaluation battery

Figure 11:
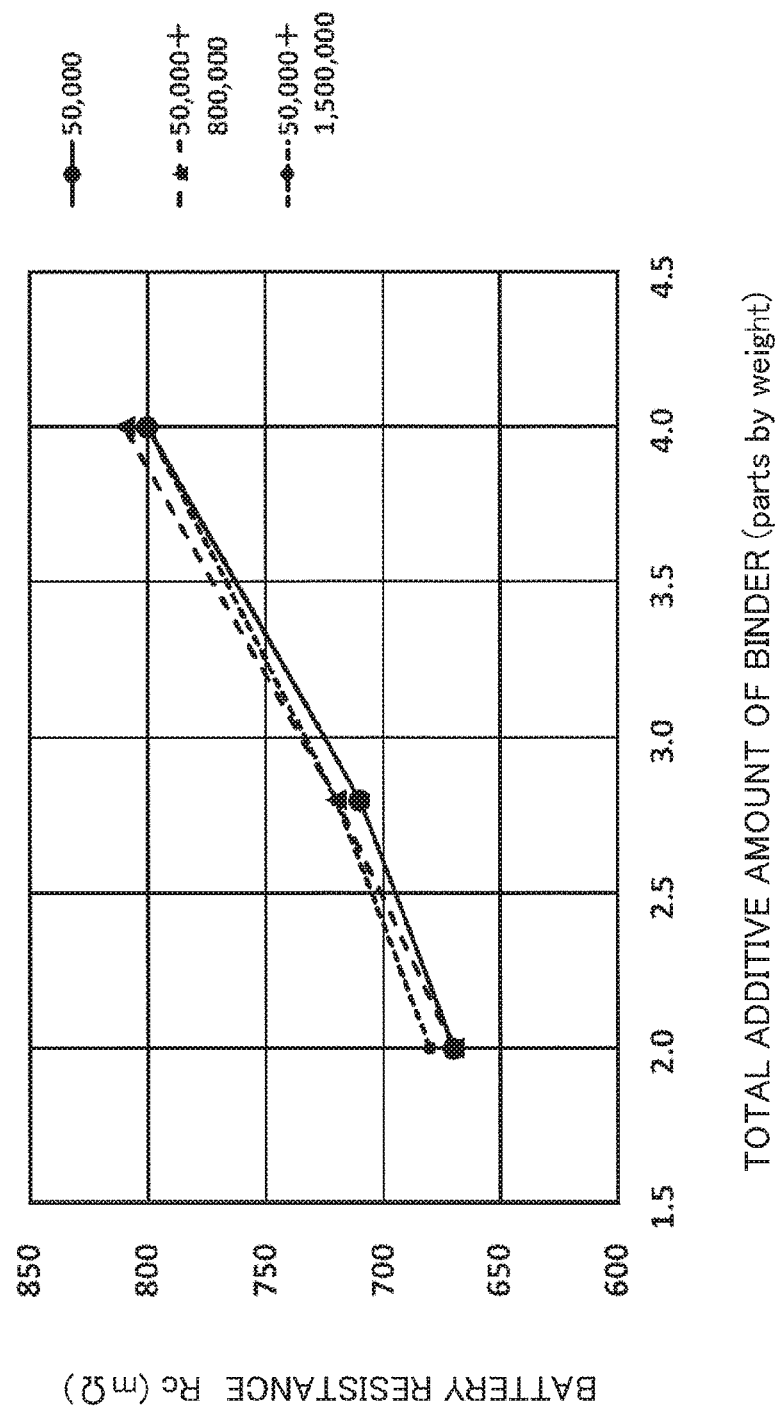
FIG. 11 is a graph showing a relationship between molecular weight and additive amount of binder (polyacrylic acid) and battery resistance of a battery using the positive electrode sheet with a positive mixture layer having the binder added therein.

As revealed from Table 3 and a graph in FIG. 11, the battery resistance Rc is hardly influenced by the magnitude of each of the molecular weights of the binders (polyacrylic acid) and the combination of the molecular weights and depends on the total additive amount of the binders. To be concrete, it is found that as the total additive amount of the binders is larger, the battery resistance Rc is also larger. To produce a battery with low resistance, therefore, it is preferable to reduce the total additive amount of the binders. Specifically, the total additive amount of the binders is set to 3.0 pts. wt. or less, the evaluation battery can provide the battery resistance Rc reduced to 730 mΩ or less.

(Study D: Relationship between thickness of first mixture layer and battery resistance of a battery including a positive electrode sheet having a positive active material layer formed of a first mixture layer and a second mixture layer)

Prior to forming the second mixture layer 23B in such a way that the strong alkaline second positive electrode paste PP2 is applied and dried on the first mixture layer 23A formed on a positive current collecting foil, the relationship between the thickness TA of the first mixture layer formed as a base layer and the battery resistance Rc of the evaluation battery including the produced positive electrode sheet was investigated. Every positive electrode sheet is provided, on each surface of a positive current collecting foil made of aluminum and with a thickness of 15 μm, with a positive active material layer formed of the first mixture layer (Thickness TA) and the second mixture layer (Thickness TB) and hence having a thickness of 25 μm (=TA+TB).

In this study D, when compositions of the first positive electrode paste PP1 (the first mixture layer 23A) were set, as in the first embodiment and the studies A to C, at a ratio by weight expressed by: Positive active material particles:Conductive auxiliary agent (Acetylene black):Thickening agent (CMC)=93.4:5.7:0.9, and their solid content was 100 pts. wt., the polyacrylic acid (first binder) with a molecular weight M of 50,000 was added in α=1.9 pts. wt. and the polyacrylic acid (second binder) with a molecular weight M of 800,000 was added in β=0.9 pts. wt. (First total additive amount S1 (=α+β) of 2.8 pts. wt.). Accordingly, the pH of the first positive electrode paste PP1 is 8.6. This first positive electrode paste is less likely to corrode even when it is applied to the positive current collecting foil made of aluminum.

In contrast, when compositions of the second positive electrode paste PP2 (the second mixture layer 23B) are also set at a ratio by weight expressed by: Positive active material particles:Conductive auxiliary agent (Acetylene black):Thickening agent (CMC)=93.4:5.7:0.9, and their solid content was 100 pts. wt., the polyacrylic acid with a relatively low molecular weight was not added and only the polyacrylic acid with a molecular weight M of 800,000 was added in γ=0.9 pts. wt. as the third binder (Second total additive amount S2=γ=0.9 pts. wt.). Accordingly, the pH of the second positive electrode paste PP2 is 11.6. This second positive electrode paste is strongly alkaline and is likely to corrode when it is directly applied to the positive current collecting foil made of aluminum.

As an evaluation battery, a battery equivalent to the evaluation battery used in the foregoing study C is produced and subjected to measurement of its battery resistance Rc.

TABLE 4

| Thickness of 1$^{st}$ mixture layer (μm) | Thickness of 2$^{nd}$ mixture layer (μm) | Battery resistance (mΩ) |
|---|---|---|
| 1.0 | 24 | 740 |
| 3.0 | 22 | 650 |
| 5.0 | 20 | 670 |
| 10 | 15 | 690 |
| 15 | 10 | 710 |

Positive current collecting foil: Aluminum: 15 μm

Thickness of Positive active material layer: T=TA+TB: 25 μm (one surface)

Weight per unit area of Positive active material layer: 6.4 mg/cm$^2$, Density: 2.4 g/cm$^3$ pH of 1$^{st}$ positive electrode paste: 8.6 pH of 2$^{nd}$ positive electrode paste: 11.6

Figure 12:
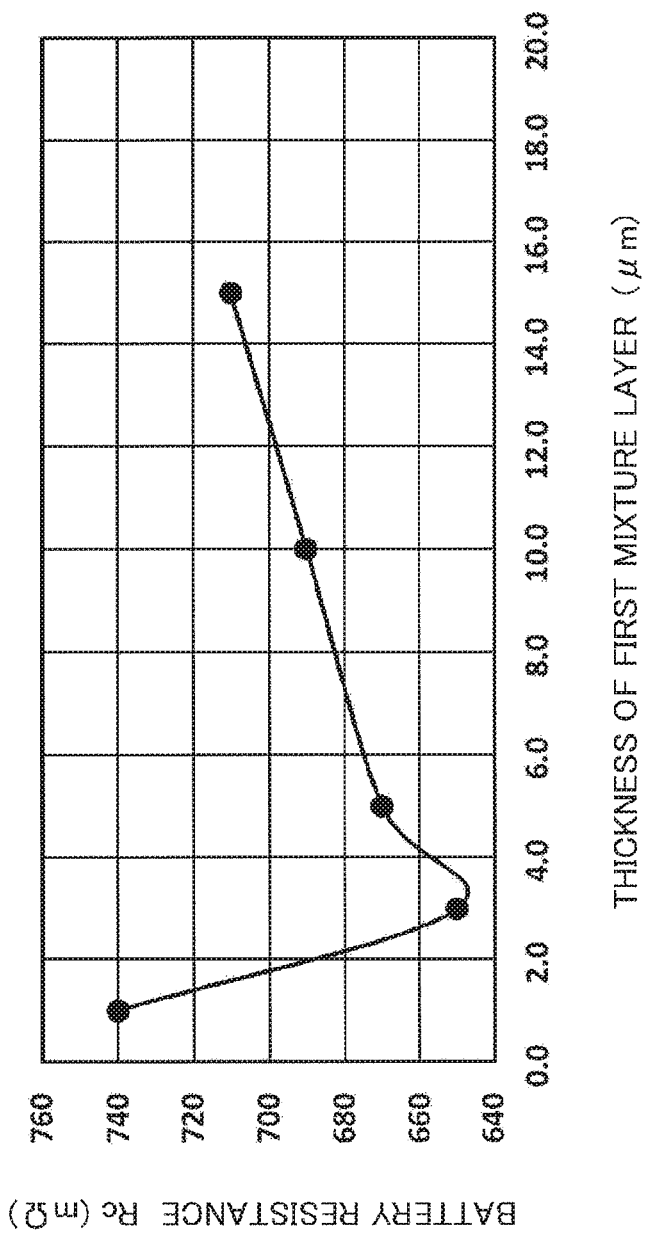
FIG. 12 is a graph showing a relationship between thickness of a first mixture layer and battery resistance of a battery using the positive electrode sheet with a positive active material layer formed of the first mixture layer and a second mixture layer.

According to the study D, as revealed from Table 4 and FIG. 12, for the first mixture layer 23A having a thickness of 3.0 μm, the battery resistance Rc is the lowest. For the first mixture layer 23A having a thickness less than 3.0 μm, the battery resistance Rc is drastically higher as this thickness is smaller. It is conceived that when the thickness of the first mixture layer 23A is less than 3.0 μm, the second positive electrode paste PP2 applied on this first mixture layer 23A penetrates into the first mixture layer 23A and reaches the coated portion 22C of the positive current collecting foil 22, causing corrosion of the positive current collecting foil 22 in the coated portion 22C. This causes rough contact between the positive current collecting foil 22 and the positive active material layer 23, so that resistance rises in this contact portion, resulting in increased battery resistance Rc.

In contrast, when the thickness of the first mixture layer 23A is thicker than 3.0 μm, the battery resistance Rc is gradually larger as the thickness is thicker. Comparing between the first mixture layer 23A and the second mixture layer 23B, the first total additive amount S1 of the binders in the first mixture layer 23A is 2.8 pts. wt., while the second total additive amount S2 of the binder in the second mixture layer 23B is 0.9 pts. wt. Thus, as revealed from the results in the study D, because of a large amount of the binders, the first mixture layer 23A is higher in volume specific resistance as compared with the second mixture layer 23B. Accordingly, it is conceived that as the first mixture layer 23A is thicker and the percentage of the first mixture layer 23A in the positive active material layer 23 is larger, the resistance of the positive electrode sheet and hence the resistance of the battery is higher.

Those results show that, in terms of the relationship between the first mixture layer and the second mixture layer prepared by the compositions used in the study D, it is preferable to set the thickness TA of the first mixture layer to 3.0 μm or more (TA≥3.0 μm). This is because the first mixture layer with such thickness can appropriately prevent corrosion of the coated portion 22C of the positive current collecting foil 22. Further, the thickness TA may be set in a range of 3.0 to 7.0 μm. This is because the first mixture layer 23A having the thickness TA set in this range can not only appropriately prevent corrosion of the positive current collecting foil 22 but also reduce the battery resistance Rc in the battery (down to 680 mΩ or less in the evaluation battery).

As revealed from the results of the studies A to D, since the first positive electrode paste PP1 to be applied to the positive current collecting foil is added with the polyacrylic acid (the second binder) with a molecular weight M of 300,000 or more in an additive amount β of 0.9 pts. wt. or more, the peel strength Ip of the positive electrode sheet 21 can be maintained at 40 N/m or more (see Table 2 and FIG. 10). Furthermore, since the first positive electrode paste PP1 is further added with the polyacrylic acid (the first binder) with a molecular weight M of 50,000 or less in an additive amount α of 1.7 pts. wt. or more, the pH of the first positive electrode paste PP1 is adjusted to 9.0 or less, thereby preventing corrosion of the positive current collecting foil 22 applied with such first positive electrode paste PP1 and thus preventing an increase in battery resistance (see Table 1 and FIG. 9). In addition, reducing the total additive amount S1 (=α+β) of the polyacrylic acid to 3.0 pts. wt. or less can suppress an increase in volume specific resistance associated with addition of the binders in the first mixture layer 23A when the positive active material layer 23 is formed of only the first mixture layer and when the positive active material layer 23 is formed of the first mixture layer 23A and the second mixture layer 23B. This can reduce the battery resistance Rc of the foregoing evaluation battery for example to 730 mΩ or less (see Table 3 and FIG. 11). Thus, the battery 1 with low battery resistance Rc can be achieved.

When the polyacrylic acid with a molecular weight M of 800,000 or more is used as the polyacrylic acid (the second binder) with a molecular weight M of 300,000 or more, the resultant first mixture layer 23A made of the first positive electrode paste can have further enhanced binding strength. For the additive amount β of 0.9 pts. wt. or more, the peel strength Ip of the first mixture layer 23A formed on the positive current collecting foil 22 can be increased to 60 N/m or higher (Ip≥60 N/m) (see Table 2 and FIG. 10).

In the positive electrode sheet 21 including the positive active material layer 23 configured such that the second mixture layer 23B is formed on the first mixture layer 23A having a thickness of 3 μm or more, even though the second mixture layer 23B is formed by applying the second positive electrode paste PP2 of pH 9.0 or more, the positive current collecting foil 22 made of aluminum is not corroded (the coated portion 22C contacting with the positive active material layer 23 is a uncorroded surface. This can prevent resistance increase between the positive current collecting foil 22 and the positive active material layer 23 formed of the first mixture layer 23A and the second mixture layer 23B due to corrosion of the positive current collecting foil 22. Thus, it is possible to suppress an increase in battery resistance Rc of the battery 1 associated with the increase resistance between the positive current collecting foil 22 and the positive active material layer 23.

Furthermore, as understood referring to Table 3 and FIG. 11, when the total additive amount S2 of the polyacrylic acid (the third binder) of the second positive electrode paste PP2 is set smaller than the total additive amount S1 of the polyacrylic acid of the first positive electrode paste PP1 (S2<S1), the second mixture layer 23B is lower in volume specific resistance than the first mixture layer 23A. This can provide the positive electrode sheet 21 with low resistance in which the second mixture layer 23B is formed on the positive current collecting foil 22 through the first mixture layer 23A without causing corrosion of the positive current collecting foil 22 (see Table 4 and FIG. 12). Thus, the battery 1 can be provided with low battery resistance Rc.

EXAMPLES AND COMPARATIVE EXAMPLES

In Examples 1 and 2 and Comparative examples 1 and 2, positive electrode sheets each including a positive active material layer formed of only a single, first mixture layer made of the first positive electrode paste PP1 applied and dried, and properties and others of evaluation batteries using those positive electrode sheets are investigated. In Examples 3 to 6 and Comparative example 3, the positive electrode sheets each including a positive active material layer formed in a two-layer structure in which the second mixture layer is formed on the first mixture layer, and properties and others of evaluation batteries using those positive electrode sheets are investigated (Tables 5, 6, and 7).

TABLE 5

1st Positive electrode paste (1st Mixture material layer)

| | Composition (parts by weight) | | | | | | | | |
|---|---|---|---|---|---|---|---|---|---|
| | Molecular amount | | Active material | Conductive auxiliary agent | Thickening agent | Total additive amount of binders | Additive amount (α) of 1st binder | Additive amount (β) of 2nd binder | Paste (pH) | Condition |
| | 1st Binder | 2nd Binder | | | | | | | | |
| Comparative Example 1 | 50,000 | — | 93.4 | 5.7 | 0.9 | 2.8 | 2.8 | — | 8.3 | Only 1st binder |
| Comparative Example 2 | — | 800,000 | 93.4 | 5.7 | 0.9 | 2.8 | — | 2.8 | 10.3 | Only 2nd binder |
| Example 1 | 50,000 | 800,000 | 93.4 | 5.7 | 0.9 | 2.8 | 1.9 | 0.9 | 8.6 | 1st + 2nd binders |
| Example 2 | 50,000 | 1,500,000 | 93.4 | 5.7 | 0.9 | 2.8 | 1.9 | 0.9 | 8.7 | 1st + 2nd binders |
| Comparative Example 3 | 50,000 | 800,000 | 93.4 | 5.7 | 0.9 | 2.8 | 1.9 | 0.9 | 8.6 | 1st + 2nd binders |
| Example 3 | 50,000 | 800,000 | 93.4 | 5.7 | 0.9 | 2.8 | 1.9 | 0.9 | 8.6 | 1st + 2nd binders |
| Example 4 | 50,000 | 800,000 | 93.4 | 5.7 | 0.9 | 2.8 | 1.9 | 0.9 | 8.6 | 1st + 2nd binders |
| Example 5 | 50,000 | 800,000 | 93.4 | 5.7 | 0.9 | 2.8 | 1.9 | 0.9 | 8.6 | 1st + 2nd binders |
| Example 6 | 50,000 | 800,000 | 93.4 | 5.7 | 0.9 | 2.8 | 1.9 | 0.9 | 8.6 | 1st + 2nd binders |

TABLE 6

2nd Positive electrode paste (2nd Mixture material layer)

| | Composition (parts by weight) | | | | | | |
|---|---|---|---|---|---|---|---|
| | 3rd Binder | Active material | Conductive auxiliary agent | Thickening agent | Additive amount (γ) of 3rd binder (Total additive amount) | Paste (pH) | Condition |
| Comparative Example 1 | — | — | — | — | — | — | Only one layer |
| Comparative Example 2 | — | — | — | — | — | — | Only one layer |
| Example 1 | — | — | — | — | — | — | two layers |
| Example 2 | — | — | — | — | — | — | two layers |
| Comparative Example 3 | 800,000 | 93.4 | 5.7 | 0.9 | 0.9 | 11.6 | two layers |
| Example 3 | 800,000 | 93.4 | 5.7 | 0.9 | 0.9 | 11.6 | two layers |
| Example 4 | 800,000 | 93.4 | 5.7 | 0.9 | 0.9 | 11.6 | two layers |
| Example 5 | 800,000 | 93.4 | 5.7 | 0.9 | 0.9 | 11.6 | two layers |
| Example 6 | 800,000 | 93.4 | 5.7 | 0.9 | 0.9 | 11.6 | two layers |

TABLE 7

|  | 1st Positive Electrode Paste (pH) | Peel Strength (Ip) (N/m) | Battery resistance (Rc) (mΩ) | Thickness (T) of Positive Active Material (μm) | Thickness (TA) of 1st mixture material layer (μm) | Thickness (TB) of 2nd mixture material layer (μm) | Weight per unit area of Positive active material layer (mg/cm$^2$) | Density of Positive active material (g/cm$^3$) | Evaluation |
|---|---|---|---|---|---|---|---|---|---|
| CEX 1 | 8.3 | 38 | 710 | 25 | 25 | 0 | 6.4 | 2.4 | X: low peel strength |
| CEX 2 | 10.3 | 230 | 770 | 25 | 25 | 0 | 6.4 | 2.4 | X: high pH, high battery resistance |
| EX 1 | 8.6 | 88 | 720 | 25 | 25 | 0 | 6.4 | 2.4 | ○ |
| EX 2 | 8.7 | 153 | 720 | 25 | 25 | 0 | 6.4 | 2.4 | ○ |
| CEX 3 | 8.6 | 87 | 740 | 25 | 1.0 | 24 | 6.4 | 2.4 | X: high battery resistance |
| EX 3 | 8.6 | 82 | 650 | 25 | 3.0 | 22 | 6.4 | 2.4 | ○ |
| EX 4 | 8.6 | 85 | 670 | 25 | 5.0 | 20 | 6.4 | 2.4 | ○ |
| EX 5 | 8.6 | 87 | 690 | 25 | 10 | 15 | 6.4 | 2.4 | ○ |
| EX 6 | 8.6 | 88 | 710 | 25 | 15 | 10 | 6.4 | 2.4 | ○ |

CEX: Comparative example,
EX: Example
○: Good,
X: Not good

Firstly, Comparative examples 1 and 2 and Examples 1 and 2 are studied. Each of the positive active material layers of the positive electrode sheets in Comparative examples 1 and 2 and Examples 1 and 2 shown in Tables 5, 6, and 7 is formed of only the first mixture layer made of the first positive electrode paste PP1 applied and dried on a positive current collecting foil. The positive active material layer of each of the positive electrode sheets in those examples and comparative examples contains positive active material particles and others in each composition at a ratio by weight expressed by: Positive active material particles:Conductive auxiliary agent (Acetylene black):Thickening agent (CMC)= 93.4:5.7:0.9 (100 pts. wt. in total).

In Comparative example 1, however, a paste PP1 added with 2.8 pts. wt. of only the first binder having a molecular weight M of 50,000 is applied and dried. The positive active material layer of the positive electrode sheet in Comparative example 2 is made by applying and drying a paste PP1 added with 2.8 pts. wt. of only the second binder having a molecular weight M of 800,000. In contrast, the positive active material layer of the positive electrode sheet in Example 1 is made by applying and drying a paste PP1 added with 1.9 pts. wt. of the first binder having a molecular weight M of 50,000 and 0.9 pts. wt. of the second binder having a molecular weight M of 800,000, i.e., 2.8 pts. wt. of the binders in total. The positive active material layer of the positive electrode sheet in Example 2 is made by applying and drying a paste PP1 added with 1.9 pts. wt. of the first binder having a molecular weight M of 50,000 and 0.9 pts. wt. of the second binder having a molecular weight M of 1,500,000, i.e., 2.8 pts. wt. of the binders in total. In each of the above examples and comparative examples, the thickness of the positive active material layer is 25 μm, the weight per unit area is 6.4 mg/cm$^2$, and the density is 2.4 g/cm$^3$. The example described as the second embodiment corresponds to Example 1.

The peel strength Ip of the positive electrode sheet are studied first below. The peel strengths Ip of the positive electrode sheets in Comparative examples 1 and 2 and Examples 1 and 2 are, respectively, 38, 230, 88, and 153 N/m. The peel strength in Comparative example 1 is below 40 N/m. It is conceived that since only the polyacrylic acid (the first binder) with a molecular weight M of 50,000 is used as the binder, the adhesion strength with respect to the positive current collecting foil is low. To the contrary, the peel strength Ip in Comparative example 2 is very high. It is conceived that using a large amount (β=2.8) of the polyacrylic acid (the second binder) with a molecular weight M of 800,000 as the binder results in high adhesion strength with respect to the positive current collecting foil. It is however conceived that the pH of the paste is as high as 10.3 and thus the positive current collecting foil corrodes, but this corrosion only slightly influences the peel strength. In Example 1, in contrast, the peel strength Ip is 88 N/m, which is good peel strength. This is conceivably because the polyacrylic acid (the second binder) with a molecular weight M of 800,000 is added in β=0.9 pts. wt. as the binder in addition to the first binder. In Example 2, the polyacrylic acid (the second binder) with a molecular weight M of 1,5000,000 higher than that in Example 1 is added in β=0.9 pts. wt., so that more excellent peel strength than in Example 1 could be obtained.

Next, the battery resistance Rc is studied below. For the battery resistance Rc, the foregoing batteries for comparison are produced by use of the corresponding positive electrode sheet in each example, and the foregoing IV resistance of each comparison battery is measured. The battery resistance of the batteries using the positive electrode sheets in Comparative examples 1 and 2 and Examples 1 and 2 are, respectively, 710, 770, 720, and 720 mΩ. In Comparative example 2, the battery resistance is high (770 mΩ) above 730 mΩ. This is conceivably because the pH of the paste is 10.3 because of use of the polyacrylic acid (the second binder) with a molecular weight M of 800,000 as the binder, causing corrosion of the positive current collecting foil, resulting in increased resistance between the positive current collecting foil and the positive active material layer, leading to increased battery resistance Rc. In Comparative example 1 and Examples 1 and 2, in contrast, good battery resistance Rc (730 mΩ) is obtained. This is conceivably because the pH of the positive electrode paste PP1 is 9.0 or less, so that the positive current collecting foil is not corroded.

In Comparative examples 1 and 2 and Examples 1 and 2, for each positive electrode sheet, the additive amount of the binders (the total additive amount S (=α+β)) is 2.8 pts. wt., which is below 3.0 pts. wt. Accordingly, an increase in battery resistance Rc associated by addition of the binder can be kept down.

In view of the results of the foregoing studies, as the first positive electrode paste to be applied to the positive current collecting foil, the polyacrylic acid (the second binder) with a molecular weight M of 300,000 or more is added in β=0.9 pts. wt. or more (β≥0.9) to keep the peel strength at high level, while the polyacrylic acid (the first binder) with a molecular weight M of 50,000 or less is added in α=1.7 pts. wt. or more (α≥1.7) to adjust the pH of the first positive electrode paste PP1 to 9.0 or less. Furthermore, it is found that the total additive amount S (=α+β) is set to 3.0 pts. wt. or less (α+β≤3.0) to suppress an increase in battery resistance associated with addition of the binders.

Next, Comparative example 3 and Examples 3 to 6 are studied below. The positive active material layers of the positive electrode sheets in Comparative example 3 and Examples 3 to 6 shown in Tables 5, 6, and 7 are each formed of a first mixture layer made of the first positive electrode paste PP1 applied and dried on a positive current collecting foil and a second mixture layer made of the second positive electrode paste PP2 applied and dried on the first mixture layer. Those positive active material layers are shown in the Study D. The example shown in the first embodiment corresponds to Example 3.

The first positive electrode pastes PP1 used in Comparative example 3 and Examples 3 to 6 are the same as that in Example 1. When the positive active material particles and others in their compositions are set at a ratio by weight expressed by: Positive active material particles:Conductive auxiliary agent (Acetylene black):Thickening agent (CMC)= 93.4:5.7:0.9 (100 pts. wt. in total), 1.9 pts. wt. of the first binder with a molecular weight M of 50,000 and 0.9 pts. wt. of the second binder with a molecular weight M of 800,000, i.e., 2.8 pts. wt. of the binders in total, are added. The second positive electrode pastes PP2 (the second mixture layers) used in Comparative example 3 and Examples 3 to 6 have the same compositions. Specifically, when the positive active material particles and others in the compositions are set at a ratio by weight expressed by: Positive active material particles:Conductive auxiliary agent (Acetylene black):Thickening agent (CMC)=93.4:5.7:0.9 (100 pts. wt. in total), the second positive electrode paste PP2 (the second mixture layer) is added with only the third binder with a molecular weight M of 800,000 in γ=0.9 pts. wt. (γ=0.9 pts. wt.).

In Comparative example 3 and Examples 3 to 6, however, the thickness T of the positive active material layer is equally 25 μm, whereas the thickness TA of the first mixture layer and the thickness TB of the second mixture layer are made different according to the examples. To be concrete, the first mixture layer is prepared at five levels; TA=1.0, 3.0, 5.0, 10, and 15 μm.

Firstly, the peel strength Ip of the positive electrode sheet is studied below. In measurement of the peel strength Ip of the positive electrode sheets in Comparative example 3 and Examples 3 to 6, the peel strength Ip is obtained in a range of 82 to 88 N/m. This is conceivably because the peel strength Ip is influenced mainly by the adhesion property of the first mixture layer 23A (the binders contained in the first mixture layer 23A), irrespective of compositions of the second mixture layer 23B.

Next, the battery resistance Rc is studied. Also in Comparative example 3 and

Examples 3 to 6, the foregoing batteries for comparison are produced by use of the positive electrode sheets in the examples and the comparative example and the foregoing IV resistance (battery resistance) is measured. The battery resistances Rc of the batteries using the positive electrode sheets in Comparative example 3 and Examples 3 to 6 are, respectively, 740, 650, 670, 690, and 710 mΩ. In Comparative example 3, specifically, the battery resistance Rc is high resistance (740 mΩ) above 730 mΩ. This is conceivably because since the thickness TA of the first mixture layer 23A is too thin (TA=1.0 μm), the second positive electrode paste PP2 of pH 10.3 applied on the first mixture layer 23A penetrates through the first mixture layer 23A and reaches the coated portion 22C of the positive current collecting foil 22, causing corrosion of the positive current collecting foil 22, so that the resistance between the positive current collecting foil and the positive active material layer increases.

In the positive electrode sheets in Examples 3 to 6, in contrast, the thickness TA of the first mixture layer 23A is obtained as 3.0 μm or more. Therefore, the second positive electrode paste PP2 applied on the first mixture layer 23A does not reach the coated portion 22C of the positive current collecting foil 22. Thus, the positive current collecting foil 22 is less likely to corrode, and the resistance between the positive current collecting foil and the positive active material layer does not occur due to corrosion. This conceivably could reduce the battery resistance Rc as compared with Comparative example 3.

In Examples 3 to 6, furthermore, as the thickness of the first mixture layer 23A is larger, the battery resistance Rc becomes higher. As described in the Study D, since the second total additive amount S2 of the binder in the second mixture layer 23B is smaller than the first total additive amount S1 of the binders in the first mixture layer 23A (S2=0.9<S1=2.8) and the volume specific resistance of the second mixture layer 23B is low, the resistance of the positive active material layer 23 is larger as the thickness TA of the first mixture layer 23A is larger (or as the thickness TB of the second mixture layer 23B is larger). It is to be noted that the case where the entire positive active material layer 23 forms the first mixture layer 23A (TA=25 μm, TB=0) corresponds to Example 1.

The present disclosure is described in the foregoing embodiments 1 and 2 and Examples, but the present disclosure is not limited thereto. It is to be understood that the present disclosure may be embodied in other specific forms without departing from the essential characteristics thereof.

For instance, the foregoing examples use the polyacrylic acid with a molecular weight of 800,000 or 1,500,000 as the second binder. As an alternative, a second binder with a molecular weight in a range of 300,000 to 2,000,000 may be adopted. The foregoing examples use the polyacrylic acid with a molecular weight of 50,000 as the first binder. As an alternative, a first binder with a molecular weight in a range of 100 to 50,000 may be adopted.

In the second embodiment and Examples 3 to 6, furthermore, the second positive electrode paste PP2 (the second mixture layer 23B) is added with only the polyacrylic acid having a relatively high molecular weight of 800,000 as the third binder, but not added with a binder having a relatively low molecular weight. However, another polyacrylic acid having a different molecular weight, e.g., a polyacrylic acid having a molecular weight of 50,000 or less may be contained in the range satisfying the following expression (4).

$$0<\gamma<\alpha+\beta \tag{4}$$

To be concrete, for example, the second positive electrode paste PP2 (the second mixture layer 23B) may be added with a binder made of polyacrylic acid having a molecular weight M of 50,000 in addition to a binder made of polyacrylic acid having a molecular weight M of 800,000, i.e., in γ=1.8 pts. wt. in total.

In the foregoing method for producing a positive electrode sheet for a lithium ion secondary battery, the second binder may be made of polyacrylic acid having a molecular weight of 800,000 or more.

In this producing method, the second binder to be added in the first positive electrode paste is the polyacrylic acid having a molecular weight M of 800,000 or more. This can further enhance the binding strength of the first positive active material layer made of the first positive electrode paste and also enhance the peel strength Ip of the first positive active material layer formed on the positive current collecting sheet to 60 N/m or more (Ip≥60 N/m).

In the method for producing a positive electrode sheet for a lithium ion secondary battery described above, the first applying and drying step may include forming the first positive active material layer having a thickness of 3 μm or more, and the method further includes a second applying and drying step of applying a second positive electrode paste to the first positive active material layer, the second positive electrode paste having been prepared by mixing the positive active material particles with the water-based solvent so that the second positive electrode paste is above pH 9.0, and drying the second positive active material layer to form a second positive active material layer.

In this producing method, in the first applying and drying step, the first positive active material layer of a thickness of 3 μm or more is formed in advance and then the second positive active material layer is formed on the first positive active material layer. Thus, even though the second positive electrode paste of above pH 9.0 is applied to form the second positive active material layer, it is possible to suppress corrosion of the positive current collecting sheet made of aluminum due to the second positive electrode paste, thereby preventing resistance increase between the positive current collecting sheet and the positive active material layer formed of the first and second positive active material layers due to corrosion of the positive current collecting sheet. This can further suppress an increase in battery resistance Rc associated with the resistance increase between the positive current collecting sheet and the positive active material layer.

The second positive electrode paste may be a second positive electrode paste capable of forming a useful second positive active material layer having lower volume specific resistance as compared with the first positive active material layer, even though having above pH 9.0. Even by using such a second positive electrode paste, it is possible to suppress corrosion of the positive current collecting sheet. In contrast, the positive electrode sheet can be produced with the second positive active material layer having a useful property. This useful property has only to be superior to that of the first positive active material layer in terms of any of electric property such as volume specific resistance, strength, safety (durability), cost, and others. The second positive electrode paste may contain the binder made of polyacrylic acid, as with the first electrode paste, or may contain other composite binder.

In the foregoing method for producing a positive electrode sheet for a lithium ion secondary battery, the second positive electrode paste may contain a third binder made of polyacrylic acid and satisfies expression (4):

$$0<\gamma<\alpha+\beta \quad (4)$$

where γ is an additive amount of the third binder in parts by weight when a solid content except the third binder in a solid content of the second positive electrode paste is 100 parts by weight.

In this producing method, the third binder is added in γ pts. wt. to the second positive electrode paste. However, even though the pH of the second positive electrode paste exceeds 9.0 as described above, the positive current collecting sheet is not corroded by the presence of the first positive active material layer with a thickness of 3 μm or more.

In contrast, it is set less than the additive amount γ of the third binder contained in the second positive electrode paste and the total additive amount α+β of the binder contained in the first positive electrode paste. This can form the second positive active material layer lower in volume specific resistance than the first positive active material layer. Thus, the positive electrode sheet with low resistance in the entire positive active material layer formed of the first and second positive active material layers. Therefore, a bb with low resistance can be achieved.

REFERENCE SIGNS LIST

PP1 First positive electrode paste
PP2 Second positive electrode paste
1 Lithium ion secondary battery (Battery)
10 Battery case
20 Electrode body
21, 221 Positive electrode sheet
22 Positive current collecting foil (Positive current collecting sheet)
22A Surface (of positive current collecting foil)
22C Active material layer coated portion (Contact surface) (of surface of positive current collecting foil)
23, 223 Positive active material layer
23A, 223A First mixture layer (First positive active material layer)
23B, 223B Second mixture layer (First positive active material layer)
T Thickness (Total thickness) (of positive active material layer)
TA Thickness (of first mixture layer)
TB Thickness (of second mixture layer)
123A First positive electrode paste layer (of applied first positive electrode paste)
123B Second positive electrode paste layer (of applied second positive electrode paste)
TPA. Thickness (of first positive electrode paste layer)
TPB Thickness (of second positive electrode paste layer)
31 Negative electrode sheet
32 Negative current collecting foil
33 Negative active material layer
39 Separator
40 Electrolyte
50 Positive terminal
51 Negative terminal
α Additive amount of first binder in first positive electrode paste or first mixture layer
β Additive amount of second binder in first positive electrode paste or first mixture layer
γ Additive amount of third binder in second positive electrode paste or second mixture layer
S1 First total additive amount
S2 Second total additive amount
Re Battery resistance
Ip Peel strength

What is claimed is:

1. A method for producing a positive electrode sheet for a lithium ion secondary battery, the positive electrode sheet comprising:
   a positive current collecting sheet made of aluminum; and
   a positive active material layer applied and dried on the positive current collecting sheet, the positive active material layer containing positive active material particles made of LiNiMn based spinel,
   wherein the positive active material layer includes a first positive active material layer provided in contact with a surface of the positive current collecting sheet, and
   the first positive active material layer includes:
      a first binder made of polyacrylic acid having a molecular weight of 50,000 or less; and
      a second binder made of polyacrylic acid having a molecular weight of 300,000 or more,
   wherein the method includes a first applying and drying step of applying a first positive electrode paste to the positive current collecting sheet, the first positive electrode paste having been prepared by mixing the positive active material particles with water-based solvent, and drying the first positive electrode paste to form the first positive active material layer, and
   the first positive electrode paste includes the first binder and the second binder, and satisfies expressions (1) to (3):

$$\alpha \geq 1.7 \quad (1)$$

$$\beta \geq 0.9 \quad (2)$$

$$\alpha + \beta \leq 3.0 \quad (3)$$

where $\alpha$ is an additive amount of the first binder in parts by weight and $\beta$ is an additive amount of the second binder in parts by weight when a solid content except the first binder and the second binder in a solid content of the first positive electrode paste is 100 parts by weight.

2. The method for producing a positive electrode sheet for a lithium ion secondary battery according to claim 1, wherein the second binder is made of polyacrylic acid having a molecular weight of 800,000 or more.

3. The method for producing a positive electrode sheet for a lithium ion secondary battery according to claim 2, wherein
   the first applying and drying step includes forming the first positive active material layer having a thickness of 3 μm or more, and
   the method further comprises a second applying and drying step of applying a second positive electrode paste to the first positive active material layer, the second positive electrode paste having been prepared by mixing the positive active material particles with water-based solvent so that the second positive electrode paste is above pH 9.0, and drying the second positive electrode paste to form a second positive active material layer.

4. The method for producing a positive electrode sheet for a lithium ion secondary battery according to claim 3, wherein
   the second positive electrode paste contains a third binder made of polyacrylic acid and satisfies expression (4):

$$0 < \gamma < \alpha + \beta \quad (4)$$

where $\gamma$ is an additive amount of the third binder in parts by weight when a solid content except the third binder in a solid content of the second positive electrode paste is 100 parts by weight.

5. The method for producing a positive electrode sheet for a lithium ion secondary battery according to claim 1, wherein
   the first applying and drying step includes forming the first positive active material layer having a thickness of 3 μm or more, and
   the method further comprises a second applying and drying step of applying a second positive electrode paste to the first positive active material layer, the second positive electrode paste having been prepared by mixing the positive active material particles with water-based solvent so that the second positive electrode paste is above pH 9.0, and drying the second positive electrode paste to form a second positive active material layer.

6. The method for producing a positive electrode sheet for a lithium ion secondary battery according to claim 5, wherein
   the second positive electrode paste contains a third binder made of polyacrylic acid and satisfies expression (4):

$$0 < \gamma < \alpha + \beta \quad (4)$$

where $\gamma$ is an additive amount of the third binder in parts by weight when a solid content except the third binder in a solid content of the second positive electrode paste is 100 parts by weight.

7. A positive electrode sheet comprising:
   a positive current collecting sheet made of aluminum; and
   a positive active material layer applied and dried on the positive current collecting sheet, the positive active material layer containing positive active material particles made of LiNiMn based spinel,
   wherein the positive active material layer includes a first positive active material layer provided in contact with the positive current collecting sheet, and
   the first positive active material layer includes:
      a first binder made of polyacrylic acid having a molecular weight of 50,000 or less; and
      a second binder made of polyacrylic acid having a molecular weight of 300000 or more, and
   the first positive active material layer satisfies expressions (1) to (3):

$$\alpha \geq 1.7 \quad (1)$$

$$\beta \geq 0.9 \quad (2)$$

$$\alpha + \beta \leq 3.0 \quad (3)$$

where $\alpha$ is an additive amount of the first binder in parts by weight and $\beta$ is an additive amount of the second binder in parts by weight when a solid content except the first binder and the second binder in a solid content of the first positive active material layer is 100 parts by weight.

* * * * *